United States Patent
Sun et al.

(10) Patent No.: US 9,477,370 B2
(45) Date of Patent: Oct. 25, 2016

(54) METHOD AND TERMINAL FOR DISPLAYING A PLURALITY OF PAGES, METHOD AND TERMINAL FOR DISPLAYING A PLURALITY OF APPLICATIONS BEING EXECUTED ON TERMINAL, AND METHOD OF EXECUTING A PLURALITY OF APPLICATIONS

(71) Applicant: Samsung Electronics Co. Ltd., Suwon-si, Gyeonggi-do (KR)

(72) Inventors: Kwang-won Sun, Suwon-si (KR);
Kang-tae Kim, Yongin-si (KR);
Doo-hwan Kim, Suwon-si (KR);
Eun-young Kim, Yongin-si (KR);
Chul-joo Kim, Suwon-si (KR);
Duck-hyun Kim, Suwon-si (KR);
Jong-won Han, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 13/861,722

(22) Filed: Apr. 12, 2013

(65) Prior Publication Data

US 2013/0290887 A1    Oct. 31, 2013

(30) Foreign Application Priority Data

Apr. 26, 2012  (KR) .................. 10-2012-0043893
Aug. 28, 2012  (KR) .................. 10-2012-0094446
Dec. 28, 2012  (KR) .................. 10-2012-0157206

(51) Int. Cl.
*G06F 13/00*    (2006.01)
*G06F 15/00*    (2006.01)
(Continued)

(52) U.S. Cl.
CPC .......... *G06F 3/0481* (2013.01); *G06F 3/0482* (2013.01); *G06F 3/0483* (2013.01); *G06F 3/0486* (2013.01); *G06F 3/04883* (2013.01)

(58) Field of Classification Search
CPC ..................... G06F 3/0416; G06F 3/04883
USPC .............. 715/835, 716, 839, 863, 702
See application file for complete search history.

(56) References Cited

U.S. PATENT DOCUMENTS 6,686,852 B1    2/2004  Guo
8,473,870 B2    6/2013  Hinckley et al.
(Continued)

FOREIGN PATENT DOCUMENTS

CN    1344989 A    4/2002
CN    1458576 A    11/2003
(Continued)

OTHER PUBLICATIONS

Customizing Acrobat X Common Tools, pp. 1 to 8 [Retrieved From the Internet on Sep. 19, 2014]. URL:http://web.archive.org/web/20120321023019/http://blogs.adobe.com/acrolaw/2012/03/customizing-acrobat-x-common-tools.
(Continued)

*Primary Examiner* — Kevin Nguyen
(74) *Attorney, Agent, or Firm* — Jefferson IP Law, LLP

(57) ABSTRACT

A method of displaying a plurality of pages on a screen of a terminal is provided. The method includes detecting a user's gesture that requests movement of the plurality of pages, identifying a movement mode relating to the movement of the plurality of pages, and moving and displaying a first page displayed on the screen and a second page connected to the first page displayed on the screen according to the identified movement mode, wherein the movement mode is one of a discrete mode and a continuous mode.

27 Claims, 32 Drawing Sheets

(51) Int. Cl.
*G06F 3/0481* (2013.01)
*G06F 3/0482* (2013.01)
*G06F 3/0483* (2013.01)
*G06F 3/0488* (2013.01)
*G06F 3/0486* (2013.01)

(56) References Cited

U.S. PATENT DOCUMENTS

| | | |
|---|---|---|
| 2003/0076362 A1 | 4/2003 | Terada |
| 2004/0056903 A1 | 3/2004 | Sakai |
| 2005/0235220 A1 | 10/2005 | Duperrouzel et al. |
| 2007/0192726 A1 | 8/2007 | Kim et al. |
| 2008/0172609 A1 | 7/2008 | Rytivaara |
| 2008/0214239 A1 | 9/2008 | Hashimoto et al. |
| 2008/0320396 A1 | 12/2008 | Mizrachi et al. |
| 2009/0002335 A1 | 1/2009 | Chaudhri |
| 2009/0064055 A1 | 3/2009 | Chaudhri et al. |
| 2009/0307631 A1 | 12/2009 | Kim et al. |
| 2009/0322690 A1 | 12/2009 | Hiltunen et al. |
| 2010/0062811 A1 | 3/2010 | Park et al. |
| 2010/0088634 A1 | 4/2010 | Tsuruta et al. |
| 2010/0214278 A1 | 8/2010 | Miura |
| 2010/0248788 A1 | 9/2010 | Yook et al. |
| 2011/0039602 A1 | 2/2011 | McNamara et al. |
| 2011/0078624 A1 | 3/2011 | Missig et al. |
| 2011/0163974 A1 | 7/2011 | Choi et al. |
| 2011/0209103 A1* | 8/2011 | Hinckley et al. ............ 715/863 |
| 2012/0079432 A1 | 3/2012 | Lee et al. |
| 2012/0089947 A1* | 4/2012 | Lee et al. ..................... 715/839 |
| 2012/0176322 A1 | 7/2012 | Karmi et al. |
| 2012/0240042 A1* | 9/2012 | Migos et al. ................ 715/702 |
| 2012/0303476 A1 | 11/2012 | Krzyzanowski et al. |
| 2013/0268858 A1* | 10/2013 | Kim et al. ................... 715/716 |
| 2013/0290887 A1 | 10/2013 | Sun et al. |
| 2014/0075286 A1* | 3/2014 | Harada ........................ 715/234 |
| 2014/0109010 A1* | 4/2014 | Casey et al. ................. 715/835 |
| 2014/0258897 A1 | 9/2014 | Shiplacoff et al. |

FOREIGN PATENT DOCUMENTS

| | | |
|---|---|---|
| CN | 101352057 A | 1/2009 |
| CN | 101821707 A | 9/2010 |
| CN | 102099776 A | 6/2011 |
| CN | 102147679 A | 8/2011 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2007-334525 A | 12/2007 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-2010-0053823 A | 5/2010 |
| KR | 10-2011-0080894 A | 7/2011 |
| KR | 10-2013-0120761 A | 11/2013 |
| WO | 2008/090902 A1 | 7/2008 |
| WO | 2009/017175 A1 | 2/2009 |
| WO | 2009/028892 A2 | 3/2009 |
| WO | 2012/103117 A1 | 8/2012 |

OTHER PUBLICATIONS

Songyang Lao et al., "A gestural interaction design model for multi-touch displays," Published by the British Computer Society, p. 440-446, 2009.

* cited by examiner

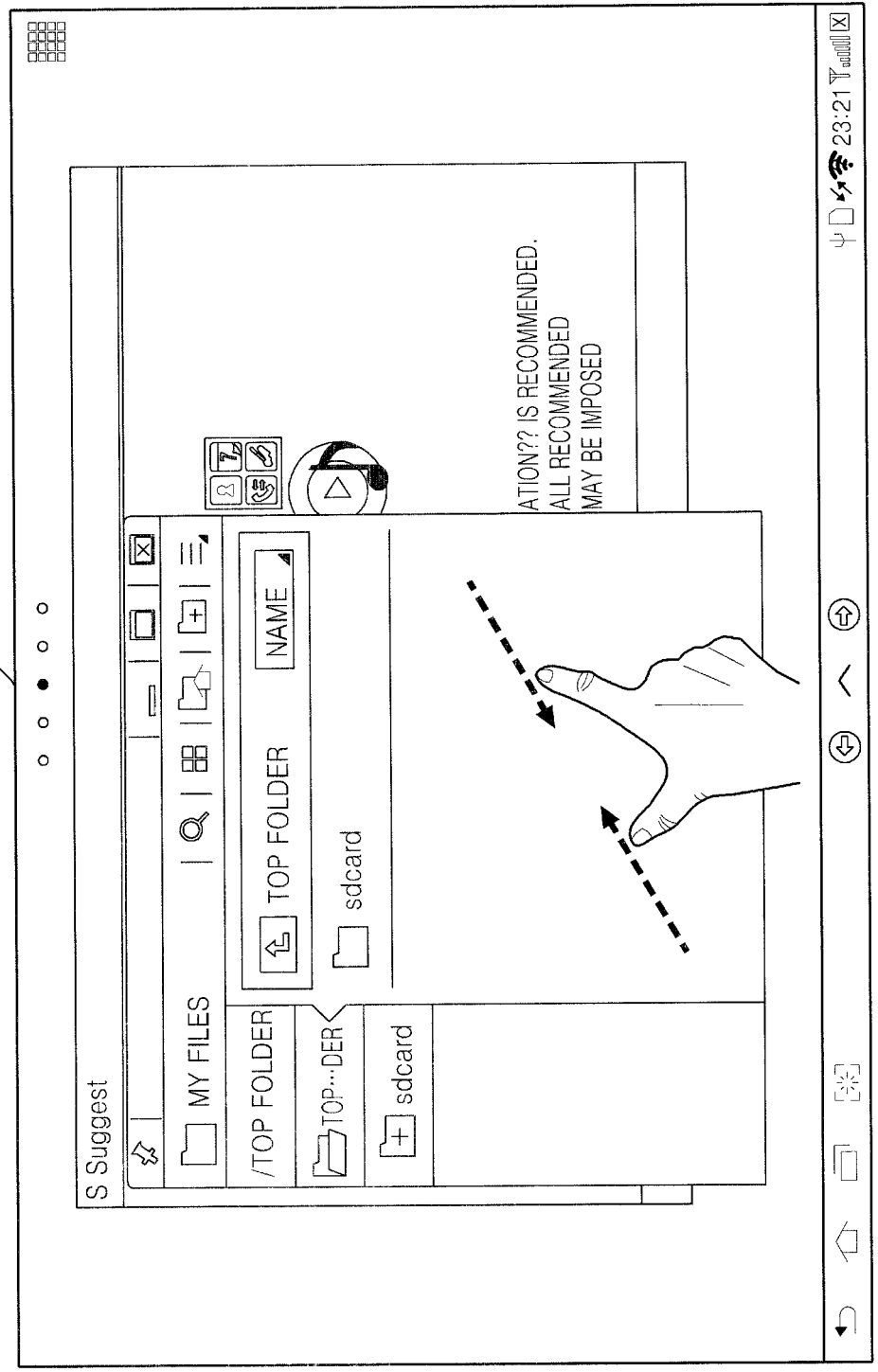

METHOD AND TERMINAL FOR DISPLAYING A PLURALITY OF PAGES, METHOD AND TERMINAL FOR DISPLAYING A PLURALITY OF APPLICATIONS BEING EXECUTED ON TERMINAL, AND METHOD OF EXECUTING A PLURALITY OF APPLICATIONS

PRIORITY

This application claims the benefit under 35 U.S.C. §119 (a) of a Korean patent application filed on Apr. 26, 2012 in the Korean Intellectual Property Office and assigned Serial No. 10-2012-0043893, a Korean patent application filed on Aug. 28, 2012 in the Korean Intellectual Property Office and assigned Serial No. 10-2012-0094446, and a Korean patent application filed on Dec. 28, 2012 in the Korean Intellectual Property Office and assigned Serial No. 10-2012-0157206, the entire disclosure of each of which is hereby incorporated by reference.

BACKGROUND OF THE INVENTION

1. Field of the Invention

The present invention relates to a method and terminal for displaying a plurality of pages according to the size of a physical screen of a terminal, a method and terminal for displaying a plurality of applications being executed on the terminal, and a method of executing a plurality of applications.

2. Description of the Related Art

A terminal may be configured to perform various functions such as a data and voice communication function, a function of capturing an image or taking a video by using a camera, a voice storing function, a function of playing a music file by using a speaker system, a function of displaying an image or video, and the like.

Some terminals include an additional function of performing a game, while other terminals are implemented as a multimedia device. Furthermore, as the development of smart phones has considerably accelerated, the development and use of various applications for smart phones have increased.

However, when a terminal provides a multi-window function, due to a limited screen size, only one or a few of windows can be executed, and thus, the utility of such multi-windows function is limited.

Thus, there is a need for the development of a system to maximize the use of multi-windows.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and terminal for displaying a plurality of pages according to a movement mode, a method and terminal for displaying a plurality of applications being executed on the terminal, and a method of executing a plurality of applications.

According to an aspect of the present invention, a method of displaying a plurality of pages on a screen of a terminal is provided. The method includes detecting a user's gesture that requests movement of the plurality of pages, identifying a movement mode relating to the movement of the plurality of pages, and moving and displaying a first page displayed on the screen and a second page connected to the first page displayed on the screen according to the identified movement mode, wherein the movement mode is one of a discrete mode and a continuous mode.

The moving and displaying may include, in the discrete mode, moving the first page displayed on the screen and the second page connected to the first page in units of page, and in the continuous mode, moving the first page displayed on the screen and the second page connected to the first page in units of pixel.

The moving and displaying may include, when the identified movement mode is the discrete mode, moving the first page displayed on the screen and the second page connected to the first page and displaying the second page in an entire region of the screen.

The moving and displaying may include, when the identified movement mode is the continuous mode, moving the first page displayed on the screen and the second page connected to the first page and displaying a part of the first page and a part of the second page together on the screen.

The method may further include determining a size of the part of the first page displayed on the screen and a size of the part of the second page displayed on the screen based on a length of the user's gesture.

The method may further include detecting a user's input that requests execution of at least one application, and displaying an execution window of the at least one application on the part of the first page displayed on the screen and the part of the second page displayed on the screen in response to the user's input.

The method may further include detecting a user's mode change request that changes the movement mode from the continuous mode to the discrete mode, and changing the movement mode from the continuous mode to the discrete mode in response to the user's mode change request.

The changing of the movement mode from the continuous mode to the discrete mode may include selecting one of the first page and the second page, and displaying the execution window of the at least one application on the one selected page.

The selecting of the one of the first page and the second page may include selecting the one of the first page and the second page based on a ratio of a first portion of the execution window of the at least one application displayed in the first page to a second portion of the execution window of the at least one application displayed in the second page.

The changing of the movement mode from the continuous mode to the discrete mode may include displaying one of the first page and the second page in an entire region of the screen.

The displaying of the one of the first page and the second page in the entire region of the screen may include selecting one of the first page to the second page based on a ratio of the part of the first page displayed on the screen and the part of the second page displayed on the screen.

The method may further include setting the movement mode in advance based on a user's input.

The user's gesture may include at least one of a drag gesture and a flick gesture.

The identifying of the movement mode may include identifying the movement mode based on a type of the user's gesture.

The identifying of the movement mode may include, if the user's gesture includes a one-finger drag input, determining that the movement mode is the discrete mode, and if the user's gesture includes a two-finger drag input, determining that the movement mode is the continuous mode.

The plurality of pages may be arranged in at least one selected from a group consisting of a vertical direction, a horizontal direction, and a diagonal direction.

The second page may be a page connected to the first page in at least one selected from a group consisting of a vertical direction, a horizontal direction, and a diagonal direction.

The method may further include receiving a user's pinch input on the screen, and displaying all of the plurality of pages as thumbnails on the screen.

The method may further include, as one page is selected from the plurality of pages displayed as thumbnails and the selected page is dragged and dropped, changing positions where the plurality of pages is arranged.

The method may further include, as an execution window of an application displayed on a third page from among the plurality of pages displayed as thumbnails is selected and is dragged and dropped to a fourth page, moving the execution window of the application from the third page to the fourth page and displaying the execution window of the application on the fourth page.

The method may further include displaying a list of at least one application that is executed by the terminal on the screen.

The method may further include receiving a selection of at least one application from the list of the at least one application, and displaying a page where an execution window of the selected application is included, from among the plurality of pages, on the screen of the terminal.

The method may further include, as an execution window of an application included in the first page displayed on the screen is selected and flicked in a direction of the second page, moving the execution window of the selected application from the first page displayed on the screen to the second page connected to the first page.

The method may further include displaying the second page to which the execution window of the application is moved, on the screen.

According to another aspect of the present invention, a terminal for displaying a plurality of pages on a screen is provided. The terminal includes a user input unit detecting a user's gesture that requests movement of the plurality of pages, a control unit identifying a movement mode relating to the movement of the plurality of pages, and a display unit moving and displaying a first page displayed on the screen and a second page connected to the first page displayed on the screen according to the identified movement mode, wherein the movement mode is one of a discrete mode and a continuous mode.

When the identified movement mode is the discrete mode, the display unit may move the first page displayed on the screen and the second page connected to the first page and may display the second page in an entire region of the screen.

When the identified movement mode is the continuous mode, the display unit may move the first page displayed on the screen and the second page connected to the first page and may display a part of the first page and a part of the second page together on the screen.

The control unit may determine a size of the part of the first page displayed on the screen and a size of the part of the second page displayed on the screen based on a length of the user's gesture.

The user input unit may detect a user's input that requests execution of at least one application, and the display unit may display an execution window of the at least one application on the part of the first page displayed on the screen and the part of the second page displayed on the screen in response to the user's input.

The user input unit may detect a user's mode change request that changes the movement mode from the continuous mode to the discrete mode, and the control unit may change the movement mode from the continuous mode to the discrete mode in response to the user's mode change request.

The control unit may select one of the first page and the second page and may control the display unit so that the execution window of the at least one application is displayed on the one selected page.

The control unit may set the movement mode in advance based on a user's input.

The control unit may identify the movement mode based on a type of the user's gesture.

If the user's gesture includes a one-finger drag input, the control unit may determine that the movement mode is the discrete mode, and if the user's gesture includes a two-finger drag input, the control unit may determine that the movement mode is the continuous mode.

The user input unit may receive a user's pinch input on the screen, and the display unit may display all of the plurality of pages as thumbnails on the screen.

As one page is selected from the plurality of pages displayed as thumbnails and the selected page is dragged and dropped, the control unit may change positions where the plurality of pages is arranged.

As an execution window of an application displayed on a third page from among the plurality of pages displayed as thumbnails is selected and is dragged and dropped to a fourth page, the control unit may move the execution window of the application from the third page to the fourth page and displays the execution window of the application on the fourth page.

The display unit may display a list of at least one application that is executed by the terminal on the screen.

The user input unit may receive a selection of at least one application from the list of the at least one application, and the display unit may display a page where an execution window of the selected application is included, from among the plurality of pages, on the screen of the terminal.

As an execution window of an application included in the first page displayed on the screen is selected and flicked in a direction of the second page, the control unit may move the execution window of the selected application from the first page displayed on the screen to the second page connected to the first page.

The display unit of the terminal may display a page to which the application is moved, on the screen.

According to another aspect of the present invention, a method of displaying a plurality of applications being executed on a terminal is provided. The method includes executing the plurality of applications, extending a background screen based on the execution, arranging the plurality of applications executed on the extended background screen, and displaying the extended background screen, wherein the extended background screen includes a region that is currently displayed by a display unit of the terminal and a region that is not currently displayed by the display unit of the terminal.

The extending of the background screen may include extending the background screen from the currently-displayed region in a predetermined direction as the plurality of applications is executed.

The predetermined direction may include at least one selected from a group consisting of a vertical direction, a horizontal direction, and a diagonal direction.

The arranging of the plurality of applications executed on the extended background screen may include arranging execution screens of the plurality of applications executed on the extended background screen according to a predetermined criterion.

The predetermined criterion may include at least one selected from a group consisting of an order in which the plurality of applications is executed, and types of the plurality of applications.

The method may further include receiving an external input to the currently-displayed region, moving the extended background screen in a predetermined direction based on the received external input, and displaying the moved, extended background screen, wherein the currently-displayed region is changed according to a movement direction and a movement quantity of the background screen.

The predetermined direction may include at least one selected from a group consisting of a vertical direction, a horizontal direction, and a diagonal direction.

The method may further include selecting at least one from among the plurality of applications executed, receiving a control input to the at least one selected application, and controlling an execution state of the at least one selected application based on the received control input.

The controlling of the executing state of the at least one selected application based on the received control input may include at least one selected from a group consisting of changing a size of an execution screen of the at least one selected application, changing a position of the execution screen of the at least one selected application on the extended background screen, and terminating the at least one selected application.

According to another aspect of the present invention, a terminal for displaying a plurality of applications being executed on the terminal is provided. The terminal includes an execution unit executing the plurality of applications, a screen extending unit extending a background screen based on the execution, an arranging unit arranging the plurality of applications executed on the extended background screen, and a display unit displaying the extended background screen, wherein the extended background screen includes a region that is currently displayed by a display unit of the terminal and a region that is not currently displayed by the display unit of the terminal.

The screen extending unit may extend the background screen from the currently-displayed region in a predetermined direction as the plurality of applications is executed.

The predetermined direction may include at least one selected from a group consisting of a vertical direction, a horizontal direction, and a diagonal direction.

The arranging unit may arrange execution screens of the plurality of applications executed on the extended background screen according to a predetermined criterion.

The predetermined criterion may include at least one selected from a group consisting of an order in which the plurality of applications is executed, and types of the plurality of applications.

The terminal may further include a receiving unit receiving an external input to the currently-displayed region, and a screen moving unit moving the extended background screen in a predetermined direction based on the received external input, wherein the display unit displays the moved, extended background screen, and the currently-displayed region is changed according to a movement direction and a movement quantity of the background screen.

The predetermined direction may include at least one selected from a group consisting of a vertical direction, a horizontal direction, and a diagonal direction.

The terminal may further include a selection unit selecting at least one from among the plurality of applications executed, a receiving unit receiving a control input to the at least one selected application, and a control unit controlling an execution state of the at least one selected application based on the received control input.

The controlling of the executing state of the at least one selected application based on the received control input may include at least one selected from a group consisting of changing a size of an execution screen of the at least one selected application, changing a position of the execution screen of the at least one selected application on the extended background screen, and terminating the at least one selected application.

According to another aspect of the present invention, a non-transitory computer-readable recording medium having recorded thereon a program for executing the above-described method is provided.

According to another aspect of the present invention, a method of executing a plurality of applications on a terminal is provided. The method includes arranging execution windows of the plurality of applications executed on the terminal in a virtualized logical space region, moving the execution windows of the plurality of applications arranged in the virtualized logical space region based on a user's touch input to the terminal, and displaying an execution window of at least one application from among the execution windows of the plurality of applications arranged in the virtualized logical space region in a display region of the terminal based on the movement, wherein the virtualized logical space region is a space in which the display region of the terminal is virtually extended.

The arranging may include arranging the execution windows of the plurality of applications in the virtualized logical space region based on at least one selected from a group consisting of an order in which the plurality of applications is executed, and types of the plurality of applications.

The arranging may include arranging the execution windows of the plurality of applications in at least one selected from a group consisting of a vertical direction, a horizontal direction, and a diagonal direction.

The method may further include executing the plurality of applications, and extending the virtualized logical space region based on the execution.

The moving of the execution windows of the plurality of applications may include identifying a movement mode relating to movement of the execution windows of the plurality of applications, and moving the execution windows of the plurality of applications according to the identified movement mode, wherein the movement mode includes one of a discrete mode in which the execution windows of the plurality of applications is discontinuously displayed in the display region, and a continuous mode in which the execution windows of the plurality of applications is continuously displayed in the display region.

The user's touch input may include at least one selected from a group consisting of a drag input regarding a region in which the execution window of the at least one application is displayed, of the display region and a drag input regarding a region in which an execution window of at least one application is not displayed, of the display region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 12A and 12B are views of screens on which a plurality of pages is displayed in the form of a thumbnail, according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
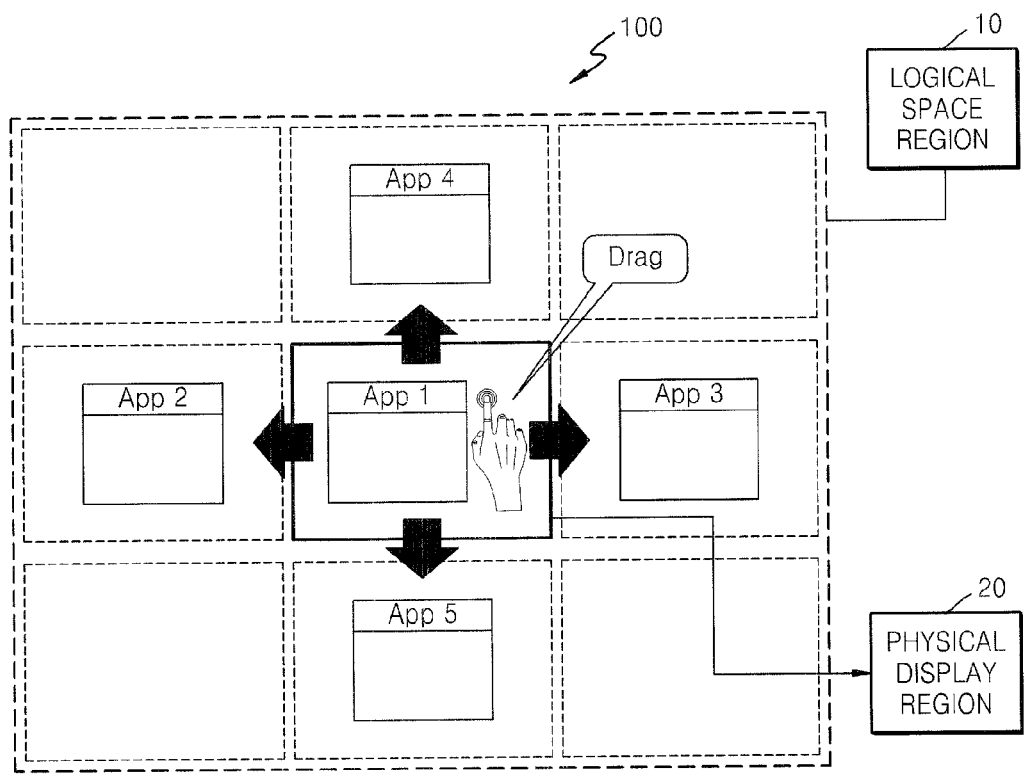
FIG. 1 is a view of a screen on which a plurality of pages is displayed by virtualizing a display region of a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a unit "comprises" an element in the present disclosure, the unit does not exclude another element but may further comprise another element unless the context clearly indicates otherwise. In addition, terms such as " . . . unit", "module", and the like used herein indicate a unit for performing at least one function or operation and may be implemented by hardware or a combination of hardware and software.

In the present disclosure, an "application" means a set of computer programs that are developed to carry out a particular work. Various applications may be described in the present disclosure. Examples of various applications include a game application, a video playing application, a map application, a memo application, a broadcasting application, a sports support application, a payment application, a photo editing application, and the like. However, aspects of the present invention are not limited thereto.

In the present disclosure, a "touch input" means a gesture that is done on a touch screen in order for a user to control a terminal. Examples of touch inputs described in the present disclosure include tap, touch & hold, double tap, drag, panning, flick, drag and drop, and the like.

"Tap" indicates an operation in which the user touches a screen very quickly by using a finger or a touch instrument such as a stylus. That is, "tap" indicates the case where a time difference between a touch-in time when the user's finger or touch instrument contacts the screen and a touch-out time when the user's finger or touch instrument takes away from the screen is very short.

"Touch & hold" indicates an operation in which the user touches the screen by using a finger or a touch instrument such as the stylus and then the touch input is maintained for a critical time or more. That is, "touch & hold" means a case where the time difference between the touch-in time and the touch-out time is equal to the critical time or longer. In order to allow the user to recognize whether a touch input is a tap or a touch & hold, if the touch input is maintained for the critical time or more, a feedback signal may be provided to the user visually or auditorily.

"Double tap" indicates an operation in which the user touches the screen twice quickly by using a finger or a touch instrument such as the stylus.

"Drag" indicates an operation in which the user touches the screen by using a finger or a touch instrument and moving the finger or touch instrument to another position on the screen while maintaining the contact between the finger or touch instrument and the screen. When a drag operation is performed, an object may be moved, or a panning operation that is described below is performed.

"Panning" indicates a case where the user performs a drag operation without selecting an object. Since in the panning operation a particular object is not selected, the object is not moved within a page but the page itself is moved in the screen or a group of objects is moved within the page.

"Flick" indicates an operation in which the user performs a drag operation very quickly by using a finger or a touch instrument. The drag (or panning) operation and the flick operation may be discriminated depending on whether the speed of moving the touch instrument is a critical speed or more.

"Drag & drop" indicates an operation in which the user drags an object to a predetermined position on the screen and then drops the object by terminating the contact between the finger or touch instrument and the screen.

"Pinch" indicates an operation in which the user moves two fingers in different directions with touching the screen. The pinch operation is a gesture for pinch opening or pinch closing of an object or page, and a pinch open value or a pinch close value is determined according to a distance between the two fingers.

"Swipe" is an operation in which the user moves a finger or a touch instrument in a horizontal or vertical direction by a predetermined distance while touching an object on the screen via the finger or the touch instrument. A movement in a diagonal direction may not be recognized as a swipe event.

The present invention will now be described more fully with reference to the accompanying drawings in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. For clarity, in the drawings, irrelevant portions with respect to the description of the present invention are omitted, and similar reference numbers are added to similar portions throughout the entire disclosure.

FIG. 1 is a view of a screen on which a plurality of pages is displayed by virtualizing a display region of a terminal according to an exemplary embodiment of the present invention.

Referring to FIG. 1, a terminal 100 according to the current exemplary embodiment of the present invention may provide a logical space region 10 that is formed by virtualizing a physical display region 20. The logical space region 10 according to the present exemplary embodiment may include a plurality of pages on which a plurality of applications may be independently executed and displayed.

Each of the plurality of pages may display an execution window in which at least one application is executed. In addition, the size of each of the pages may be the same as the size of the physical display region 20. The physical display region 20 may refer to an actual display region of the terminal 100, i.e., a screen.

The plurality of pages may be arranged in the logical space region 10 in at least one selected from the group consisting of a vertical direction, a horizontal direction, and a diagonal direction. Thus, the plurality of pages may include information regarding positions where the plurality of pages is arranged in the logical space region 10, for example, coordinate values, as well as coordinates on the physical display region 20. According to the present exemplary embodiment, positions where the plurality of pages is arranged in the logical space region 10 may vary. For example, the terminal 100 may move and rearrange the plurality of pages in the logical space region 10 based on a touch input by a user's finger or an electronic pen. That is, the user may manage the positions where the plurality of pages is arranged in the logical space region 10 based on a touch gesture.

The plurality of pages may be moved to and displayed in the physical display region 10 in units of page or pixel. For example, when the user touches the terminal 100 and drags an object on a screen of the terminal 100 in a predetermined direction, the terminal 100 may move the plurality of pages along the drag direction so that a particular page may be displayed on the screen.

According to an exemplary embodiment of the present invention, a page may be added to the logical space region 10 based on execution of an application. That is, when an application is executed, a page may be dynamically added to the logical space region 10.

Figure 12B:
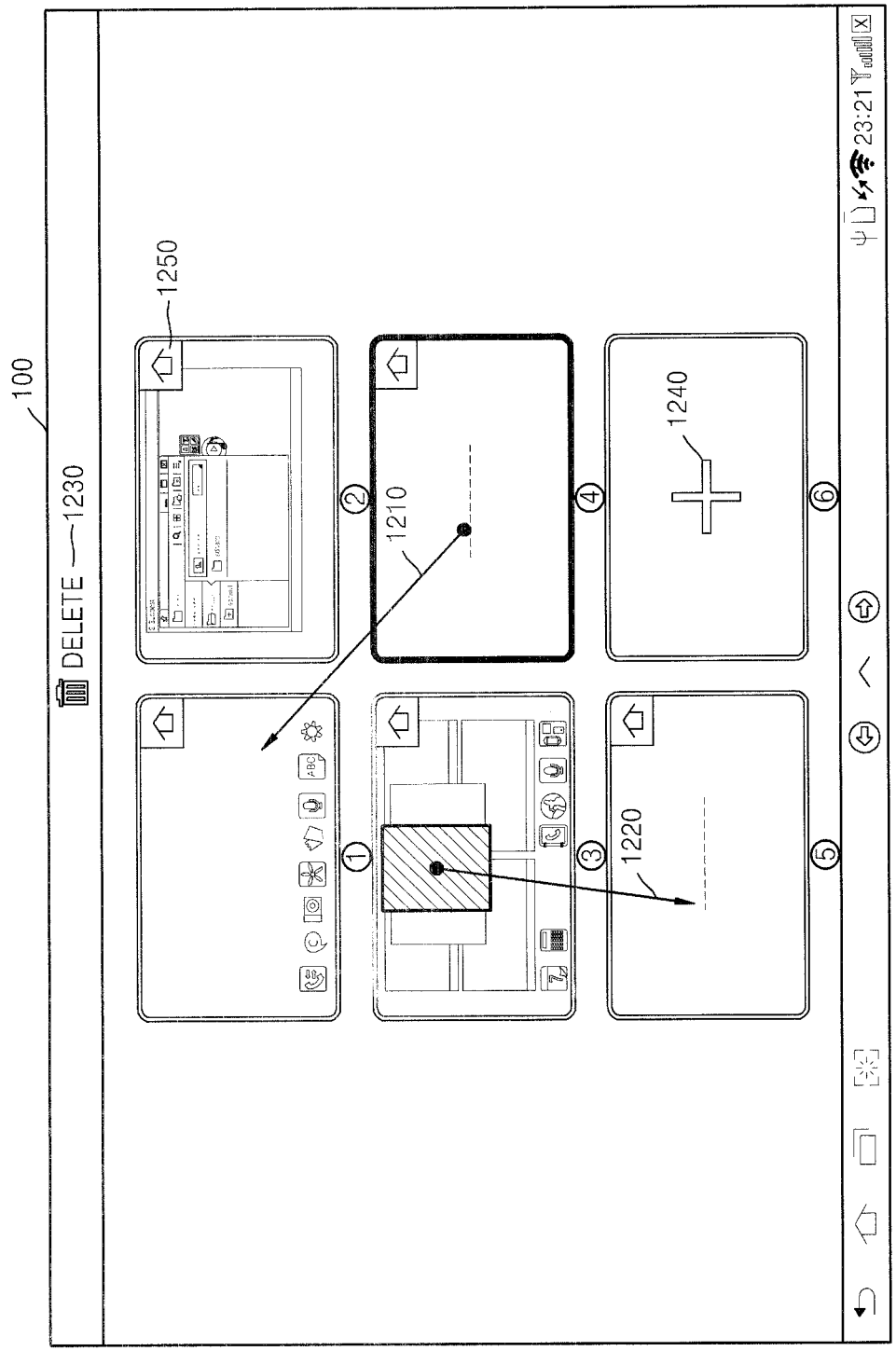

According to another exemplary embodiment of the present invention, a page may be added based on a user's page addition request (see 1240 of FIG. 12B). In this case, according to an exemplary embodiment of the present invention, the user may also set the size of an added page. For example, when the size of a general page is 1000×600 (pixel), the user may adjust the size of the added page as 700×300 (pixel).

The terminal 100 may be implemented in various shapes. For example, the terminal 100 described in the present disclosure may be a mobile phone, a smart phone, a laptop computer, a tablet Personal Computer (PC), an electronic book terminal, a digital broadcasting terminal, a Personal Digital Assistant (PDA), a portable multimedia player, a navigation device, a digital audio player, a digital camera, or the like. However, aspects of the present invention are not limited thereto.

Hereinafter, a method of displaying a plurality of pages on which an application is executed will be described in detail with reference to FIG. 2.

Figure 2:
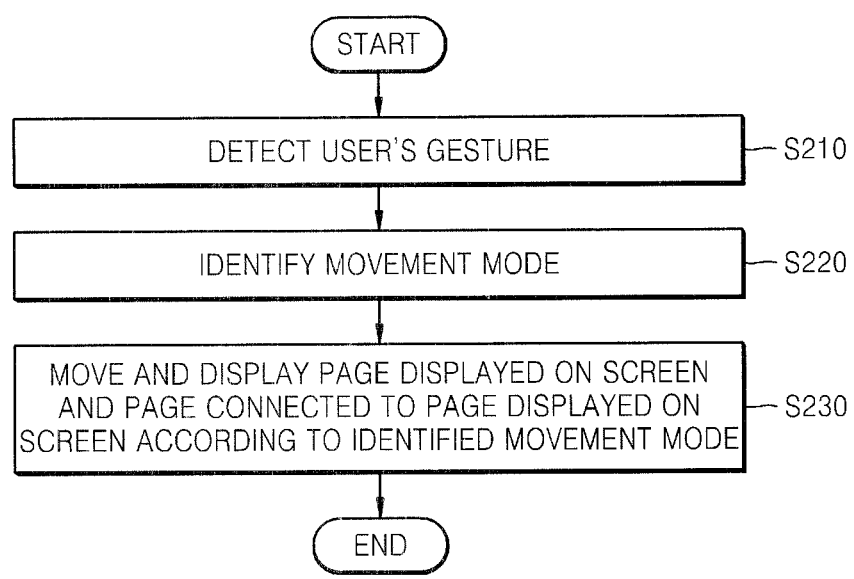
FIG. 2 is a flowchart illustrating a method of displaying a plurality of pages according to an exemplary embodiment of the present invention.

FIG. 2 is a flowchart illustrating a method of displaying a plurality of pages according to an exemplary embodiment of the present invention.

In operation S210, the terminal 100 (see FIG. 1) may detect a user's gesture that requests movement of the plurality of pages. The user's gesture includes a touch gesture, for example, a drag gesture, a flick gesture, or a tap gesture. However, aspects of the present invention are not limited thereto. That is, the screen of the terminal 100 illustrated in FIG. 1 may be a touch screen that provides a touch interface to the user.

For example, when the user touches the terminal 100 with a finger or an electronic pen and drags the same on a part of the screen in a predetermined direction, the terminal 100 may sense that a drag event occurred. The terminal 100 may also sense a drag speed, a drag direction, and the like.

In operation S220, the terminal 100 may identify a movement mode relating to movement of pages. The movement mode according to the present exemplary embodiment may be a discrete mode or a continuous mode.

The discrete mode refers to a mode in which a plurality of pages is discontinuously moved. The terminal 100 may move the plurality of pages in units of page in the discrete mode. In this case, according to the present exemplary embodiment, the terminal 100 may move the plurality of pages in units of one page or several pages.

The continuous mode refers to a mode in which the plurality of pages is continuously moved. The terminal 100 may move the plurality of pages in units of pixel in the continuous mode.

According to the present exemplary embodiment, the terminal 100 may set a movement mode in advance based on the user input. For example, FIG. 7 illustrates an example of a window for setting a movement mode according to an exemplary embodiment of the present invention.

Figure 7:
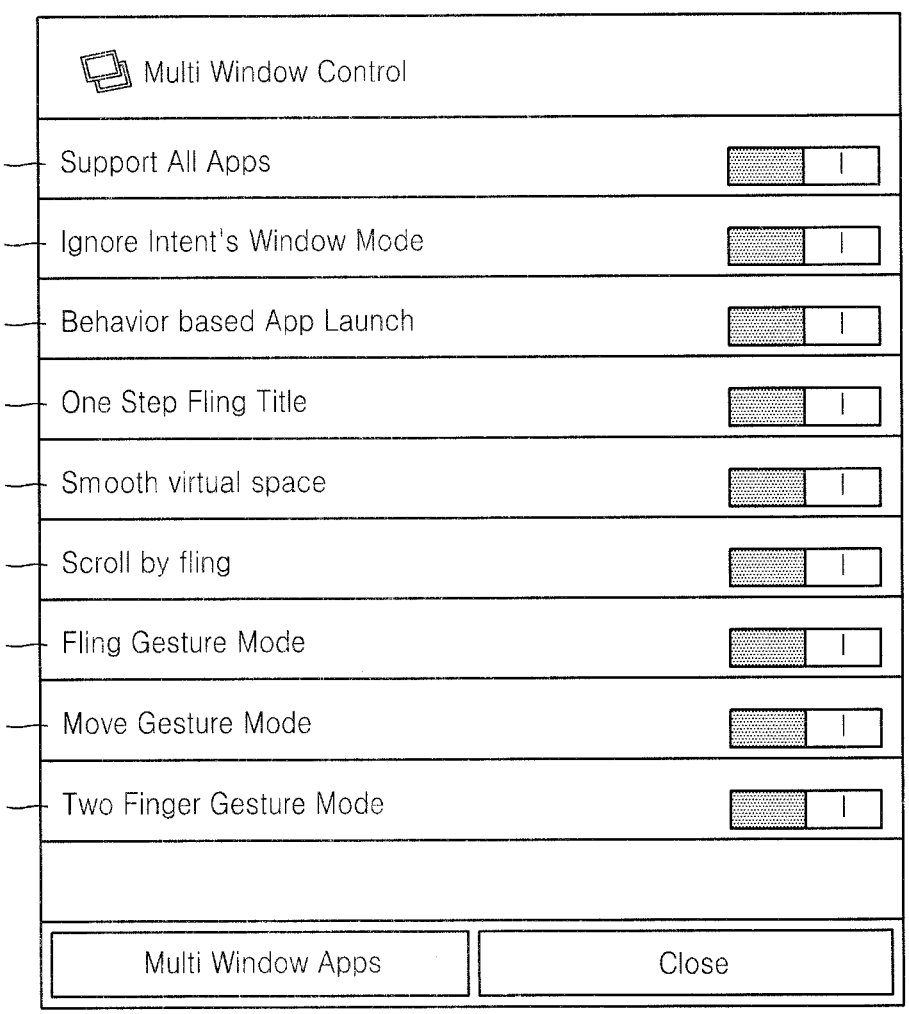
FIG. 7 illustrates an example of a window for setting a movement mode according to an exemplary embodiment of the present invention.

Referring to FIG. 7, when a toggle switch of a Smooth virtual space is moved to the left (is enabled), the terminal 100 may set a movement mode as a continuous mode, and when a toggle switch of a Smooth virtual space is moved to the right (is disabled), the terminal 100 may set a movement mode as a discrete mode.

According to the present exemplary embodiment, the terminal 100 may identify a movement mode based on a type of a user's gesture. For example, when a gesture is a one finger drag input (drag performed by touching the screen with one finger), the terminal 100 may determine a movement mode as a discrete mode, and when a gesture is a two finger drag input (drag performed by touching the screen with two or more fingers), the terminal 100 may determine a movement mode as a discontinuous mode. That is, the user drags one finger on the screen so as to move the plurality of pages in units of page, and the user drags two or more fingers on the screen so as to drag the pages in units of pixel.

Contrary to this, when a gesture is a one finger drag input (drag performed by touching the screen with one screen), the terminal 100 may determine the movement mode as a continuous mode, and when a gesture is a two finger drag input (drag performed by touching the screen with two or more fingers), the terminal 100 may determine the movement mode as a discrete mode. The continuous mode and the discrete mode may be mapped with another gesture and thus may be set.

In operation S230, the terminal 100 may move and display the page displayed on the screen and a page connected to the page displayed on the screen according to the identified movement mode. For example, according to the present exemplary embodiment, when the drag input is received, the terminal 100 may move the page displayed on the screen and the page connected to the page displayed on the screen according to the movement mode. The terminal 100 may display at least one of the page displayed on the screen and the page connected to the page displayed on the screen on the screen. This will be described in detail below with reference to FIG. 3.

The page connected to the page displayed on the screen may be a page that is connected to the page displayed on the logical space region 10 of the screen in at least one selected from the group consisting of a vertical direction, a horizontal direction, and a diagonal direction. Hereinafter, for convenience of explanation, a 'page connected to the page displayed on the screen' is referred to as a 'connected page'.

According to the present exemplary embodiment, the terminal 100 may determine directions in which the plurality of pages is moved based on a gesture's movement direction (for example, the drag direction). For example, when the user drags an object on the screen from right to left, the terminal 100 may move the plurality of pages from right to left. The terminal 100 may move the page displayed on the screen and a page connected to the right of the page displayed on the screen to the left.

In addition, when the user drags an object on the screen from top to bottom, the terminal 100 may move the plurality of pages from top to bottom. The terminal 100 may move the page displayed on the screen and a page connected to the top of the page displayed on the screen to the bottom.

A method of moving and displaying the page displayed on the screen and the connected page according to a movement mode will now be described with reference to FIG. 3 in more detail.

Figure 3:
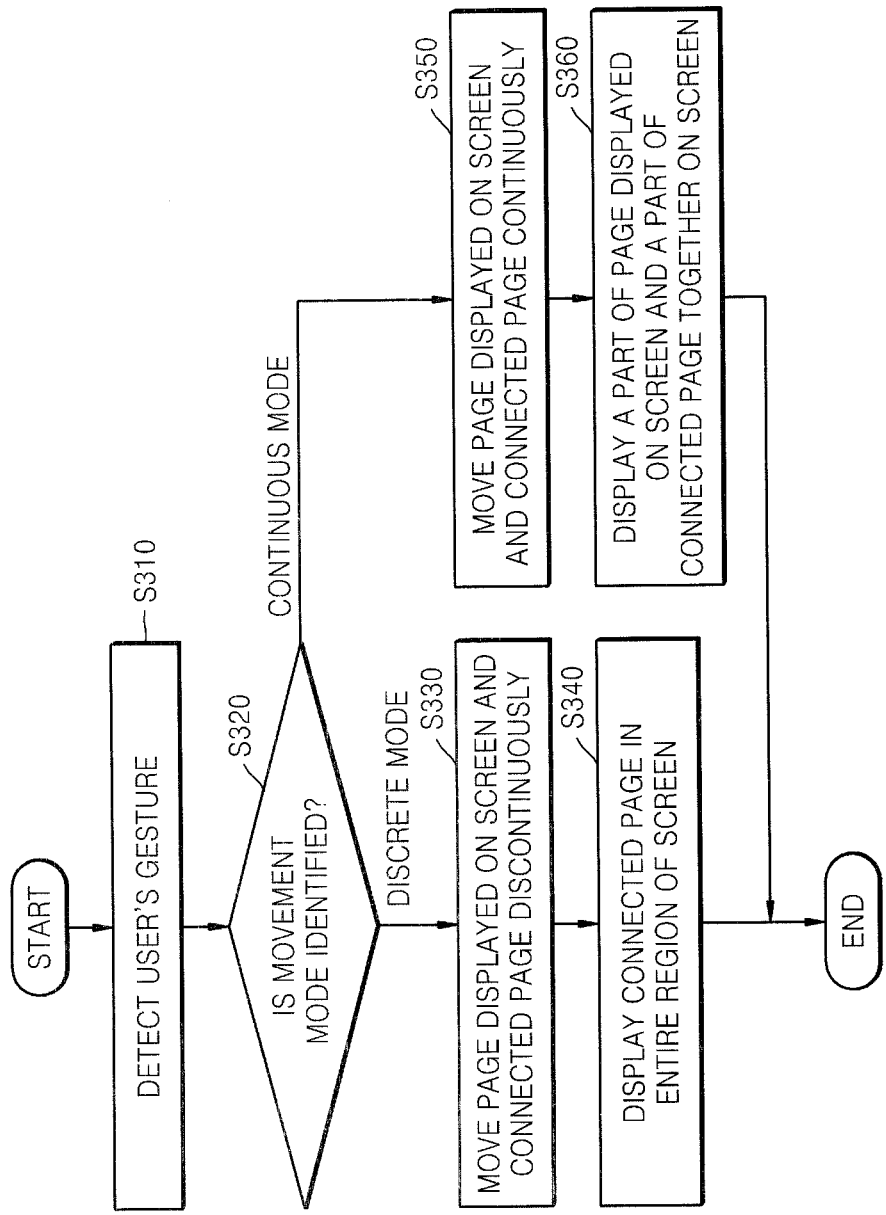
FIG. 3 is a flowchart illustrating a method of displaying a plurality of pages according to a discrete mode or a continuous mode according to an exemplary embodiment of the present invention.

FIG. 3 is a flowchart illustrating a method of displaying a plurality of pages according to a discrete mode or a continuous mode according to an exemplary embodiment of the present invention.

In operation 310, the terminal 100 may detect a user's gesture (for example, a drag input) that requests movement of the plurality of pages. In operation S320, the terminal 100 may identify a movement mode. Operations S310 and S320 correspond to operations S210 and S220 of FIG. 2, and thus, detailed descriptions thereof will be omitted.

In operation S330, when a movement mode is a discrete mode, the terminal 100 (see FIG. 1) may move the page displayed on the screen and the connected page discontinuously. In this case, since the movement mode is a discrete mode, the plurality of pages may be moved in units of page (i.e., according to the size of the screen). Thus, in operation S340, the terminal 100 may display the connected page in the entire region of the screen. This will be described with reference to FIG. 4.

Figure 4:
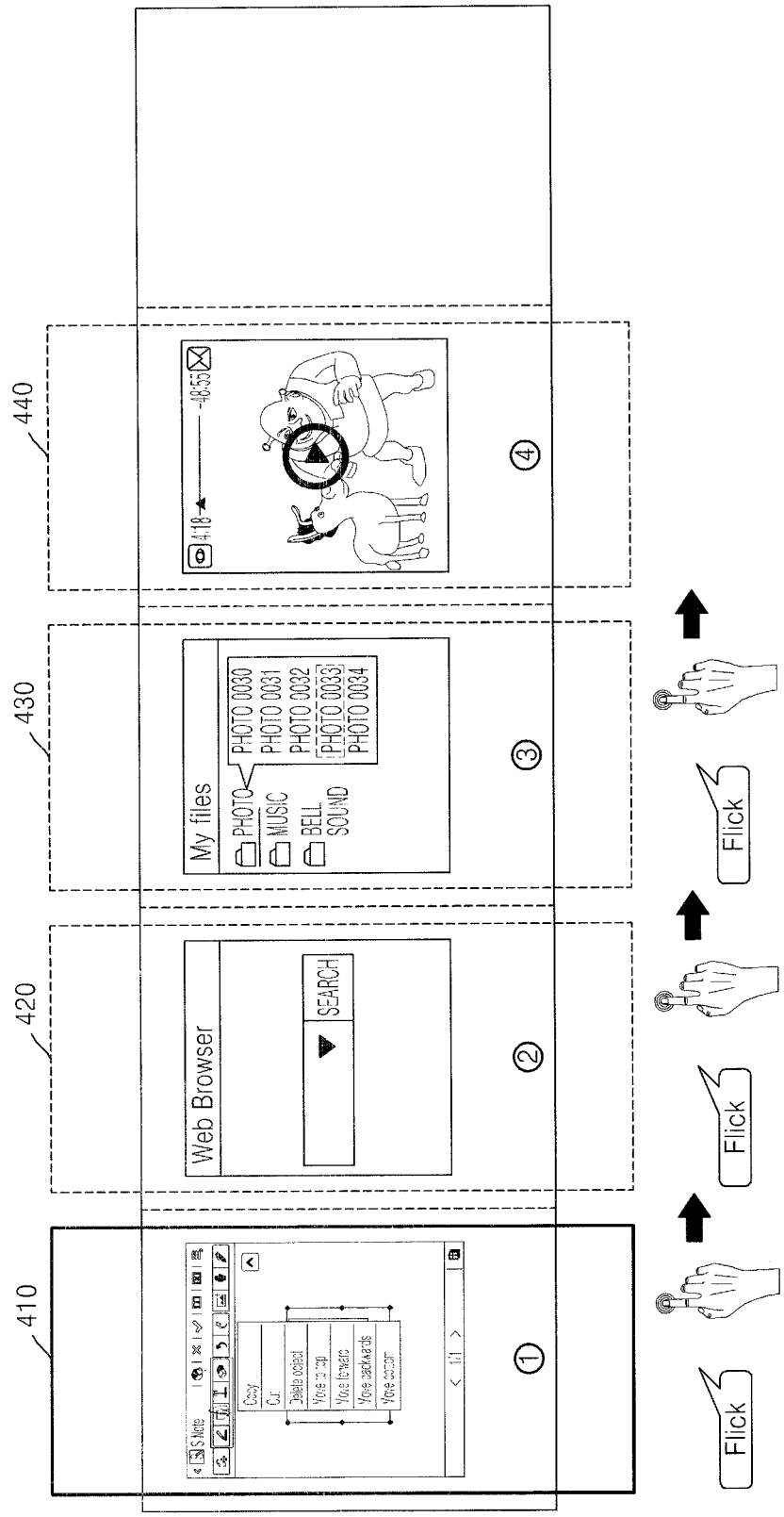
FIG. 4 is a view of a discrete mode according to an exemplary embodiment of the present invention.

FIG. 4 is a view of a discrete mode according to an exemplary embodiment of the present invention.

Referring to FIG. 4, when the user drags (or flicks) an object on the screen in the discrete mode, a plurality of pages is moved in units of page. For example, when the user drags an object on a screen on which a first page 410 is displayed, the terminal 100 may move a plurality of pages so as to display a second page 420 on the screen. In addition, when the user drags an object on a screen on which the second page 420 is displayed, the terminal 100 may move a plurality of pages so as to display a third page 430 on the screen.

Thus, according to the present exemplary embodiment, even though a plurality of applications simultaneously executed are not displayed on one screen, the plurality of applications may be displayed on a plurality of pages in the logical space region 10 (see FIG. 1), and a page displayed on the screen may be changed by a simple gesture so that the utility of using a multi window may be maximized.

Referring back to FIG. 3, in operation S350, when the movement mode is a continuous mode, the terminal 100 may move the page displayed on the screen and the connected page continuously (for example, in units of pixel). For example, the terminal 100 may move the page displayed on the screen and the connected page based on the movement length of the user's gesture (for example, the length of the drag input).

In operation S360, the terminal 100 may display a part of the page displayed on the screen and a part of the connected page together on the screen. In this case, according to the present exemplary embodiment, the terminal 100 may determine the size of a part of the page displayed on the screen and the size of a part of the connected page based on the movement length of the user's gesture (for example, the length of a drag input).

For example, when the user drags an object on the screen in the right direction by 1 cm, the terminal 100 may move the page displayed on the screen and the connected page by one pixel (or coordinate) corresponding to the distance of 1 cm to the right so that a part of the page displayed on the screen and a part of a page connected to the left of the page displayed on the screen may be displayed on the screen. This will be described with reference to FIGS. 5 and 6.

Figure 5:
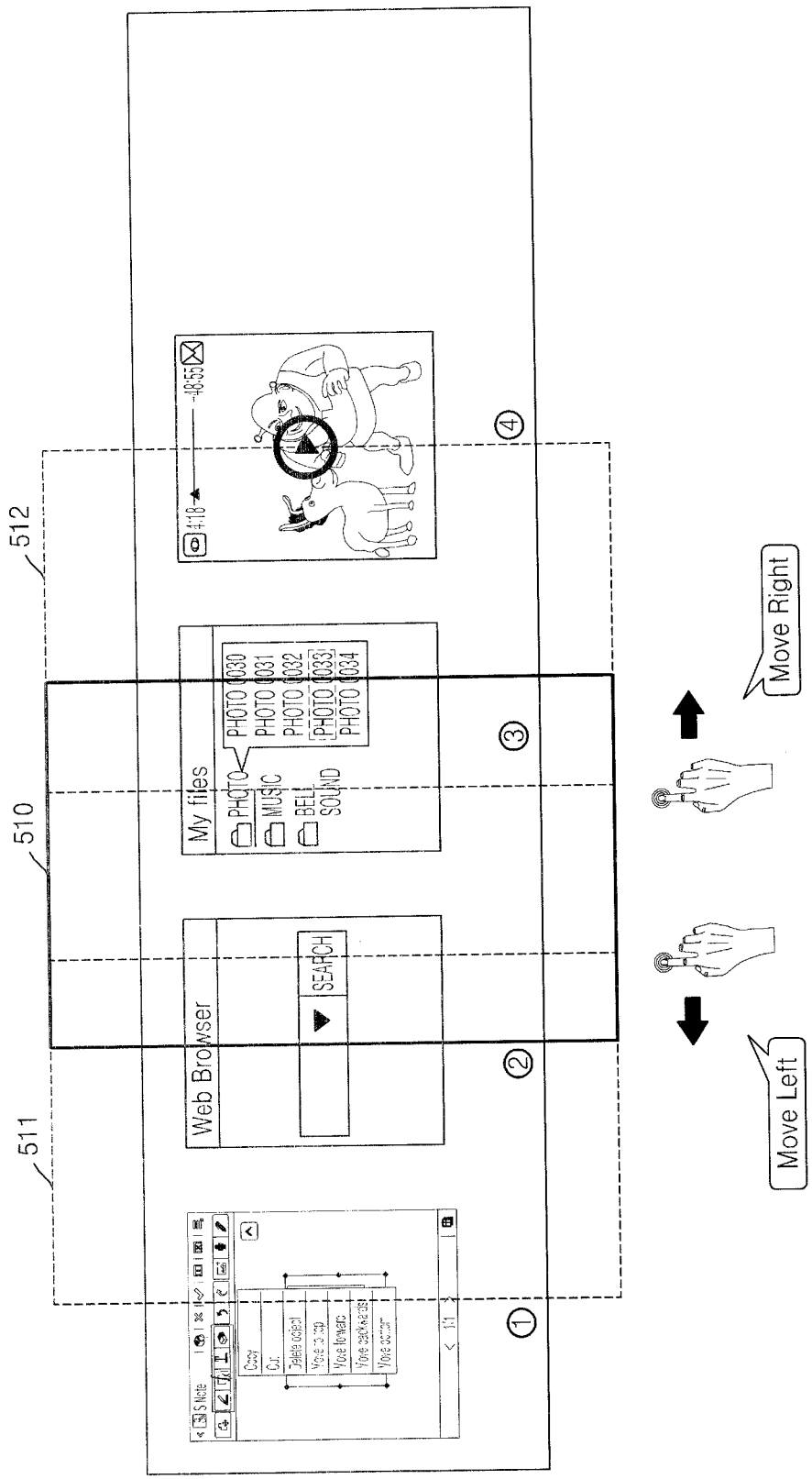
FIG. 5 is a view of a continuous mode according to an exemplary embodiment of the present invention.

FIG. 5 is a view of a continuous mode according to an exemplary embodiment of the present invention.

As illustrated in FIG. 5, the user may drag an object on the screen in the left or right direction. In this case, the terminal 100 may move a plurality of pages by the length of a user's drag input. Thus, in a continuous mode, one page may be displayed on the screen or a part of two pages may be displayed on the screen together.

Figure 6A:
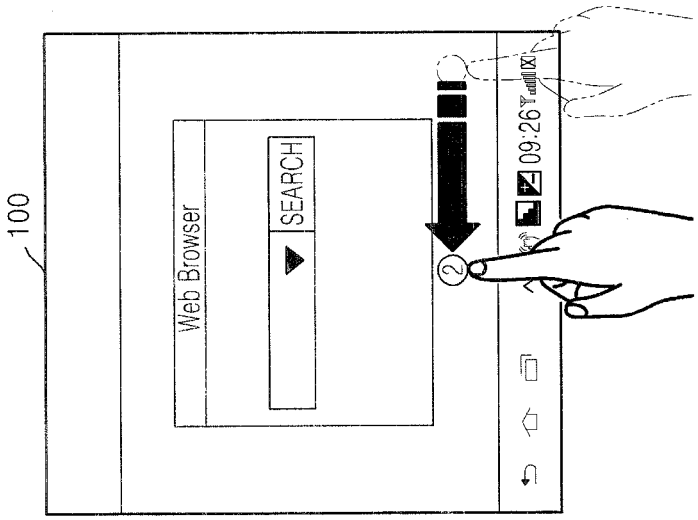
FIGS. 6A through 6C are views of screens on which a plurality of pages is displayed in a continuous mode, according to an exemplary embodiment of the present invention.
Figure 6B:
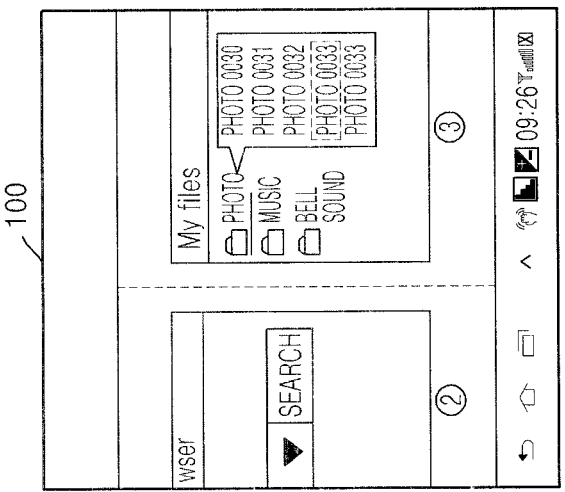
Figure 6C:
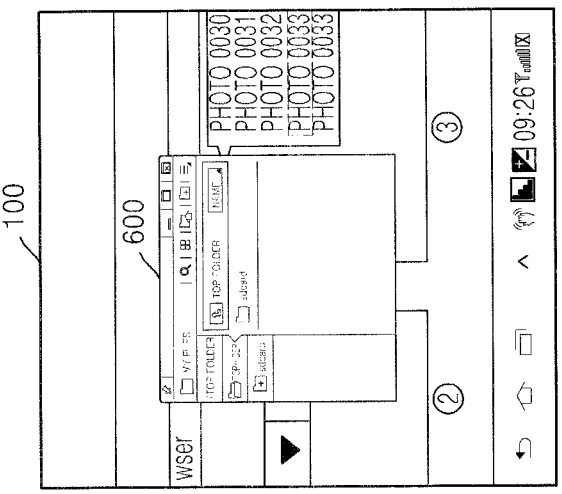

For example, when the user drags an object on a screen on which a second page including a web browser is displayed in the left direction, a part of the second page including the web browser and a part of a third page including my files may be displayed on a screen 510 (see FIGS. 6A through 6C).

On the other hand, when the user drags an object on the screen 510 on which a part of the second page and a part of the third page are displayed in the right direction, a part of the second page and a part of a first page including a memo application may be displayed on a screen 511. In addition, when the user drags an object on the screen 510 on which a part of the second page and a part of the third page are displayed in the left direction, a part of the third page and a part of a fourth page including a video playing application may be displayed on a screen 512.

FIGS. 6A through 6C are views of screens on which a plurality of pages is displayed in a continuous mode, according to an exemplary embodiment of the present invention.

Referring to FIG. 6A, the terminal 100 may detect a user's input that drags a screen on which a second page is displayed, in the left direction. In this case, when a movement mode is a continuous mode, the terminal 100 may move the second page and a third page connected to the second page in units of pixel by the length of the detected drag input.

In this case, as illustrated in FIG. 6B, the terminal 100 may display a part of the second page including a web browser and a part of the third page including my documents on the screen.

The terminal 100 may detect a user's input that executes a new application 600 apart from the web browser and my documents. In this case, when a movement mode is a continuous mode, as illustrated in FIG. 6C, a border between pages disappears, and the terminal 100 may display an execution window of the new application 600 on a part of the second page displayed on the screen and a part of the third page connected to the second page.

FIG. 7 illustrates an example of a window for setting a movement mode according to an exemplary embodiment of the present invention.

The setting window may be a window to which a user's setting value is input in relation to display of a plurality of display windows when the plurality of display windows are displayed together on the screen of the terminal 100.

Referring to FIG. 7, the setting window according to the present exemplary embodiment may include a Support All Apps field 70, an Ignore Intent's Window Mode field 71, a Behavior based App Launch field 72, an One Step Fling Title field 73, a Smooth virtual space field 74, a Scroll by fling field 75, a Fling Gesture Mode field 76, a Move Gesture Mode field 77, and a two Finger Gesture Mode field 78. In addition, buttons (for example, toggle switches) for enabling functions corresponding to the fields 70, 71, 72, 73, 74, 75, 76, 77, and 78 may be included in the fields 70, 71, 72, 73, 74, 75, 76, 77, and 78 of the setting window.

The Support All Apps field 70 is a field that is set to support a multi window function on other applications that are not set to support a multi window function as well as applications that are set to support multi window. If the function of the Support All Apps field 70 is enabled, the multi window function may be supported for all applications in the terminal 100. However, aspects of the present invention are not limited thereto.

The Ignore Intent's Window Mode field 71 is a field that ignores user's settings relating to multi window support. For example, if the Ignore Intent's Window Mode field 71 is enabled, even when the user executes an application in the entire screen mode, the application may be executed in a multi window mode (not in the entire screen mode) when the application starts being executed.

The Behavior based App Launch field 72 is a field in which a display window of a newly-executed application is displayed in a display mode of a display window that is enabled on the screen of the terminal 100.

The One Step Fling Title field 73 is a field that conveniently provides settings of a multi window function to the user. If the One Step Fling Title field 73 is disabled, a bar disposed on the top of the screen of the terminal 100 may be extended in a downward direction by a user's touch and may be dropped, and the multi window function may be set based on a user's input using a predetermined menu included in the extended bar. However, if the One Step Fling Title field 73 is enabled, when the bar disposed on the top of the screen of the terminal 100 is extended in the downward direction by a user's touch and is dropped, the multi window function may be immediately executed.

The Smooth virtual space field 74 is a field in which a plurality of pages is continuously moved on a launcher screen or home screen of the terminal 100. If the Smooth virtual space field 74 is enabled, a plurality of pages displayed on the screen of the terminal 100 may be continuously moved based on a user's drag or flick input. In detail, a first page displayed on the screen of the terminal 100 may be continuously moved in a direction of a user's flick input by a predetermined distance based on the user's flick input on a first page displayed on the screen of the terminal 100. In addition, as a result of moving the first page, a part of a second page connected to the first page and a part of the first page may be together displayed on the screen of the terminal 100 in a stopped state.

If the Smooth virtual space field 74 is disabled, a plurality of pages displayed on the screen of the terminal 100 may be discontinuously moved based on a user's drag or flick input. For example, a second page connected to a first page displayed on the screen of the terminal 100 may be displayed on the screen of the terminal 100 based on a user's flick input on the first page displayed on the screen of the terminal 100.

The Scroll by fling field 75 is a field in which a predetermined page displayed on the display window is moved to the previous or next page based on a user's input of touching a predetermined bar displayed on the display window (for example, a title bar or action bar of the display window) and dragging or flicking the predetermined bar in left or right direction.

The Fling Gesture Mode field 76 is a field in which the display window is aligned or a display mode of the display window is changed based on a user's input of touching a predetermined bar displayed on the display window (for example, a title bar or action bar of the display window) and dragging or flicking the predetermined bar.

If the Fling Gesture Mode field 76 is enabled, the terminal 100 may provide the following functions. For example, the terminal 100 may display the display window in the left or right direction of the screen of the terminal 100 in a split mode based on a user's input of touching a predetermined bar displayed on the display window and dragging or flicking the predetermined bar in a left or a right direction. In addition, the terminal 100 may change the display mode of the display window based on a user's input of touching the predetermined bar displayed on the display window and dragging or flicking the predetermined bar in an upward direction. In addition, the terminal 100 may reduce the size of the display window to a predetermined size based on a user's input of touching the predetermined bar displayed on the display window and dragging or flicking the predetermined bar in a downward direction.

The Move Gesture Mode field 77 is a field in which, if a ghost view (virtual window) formed by virtualizing the display window is moved to an upper edge, a lower edge, a left edge, or a right edge of the screen of the terminal 100, a function of displaying the display window in the form of the entire screen, a minimum screen, a right split screen, or a left split screen is set.

The Two Finger Gesture Mode field 78 is a field in which, as predetermined bars included in two display windows are together touched for a predetermined amount of time or more, two display windows are aligned in a split mode and are displayed.

Figure 8:
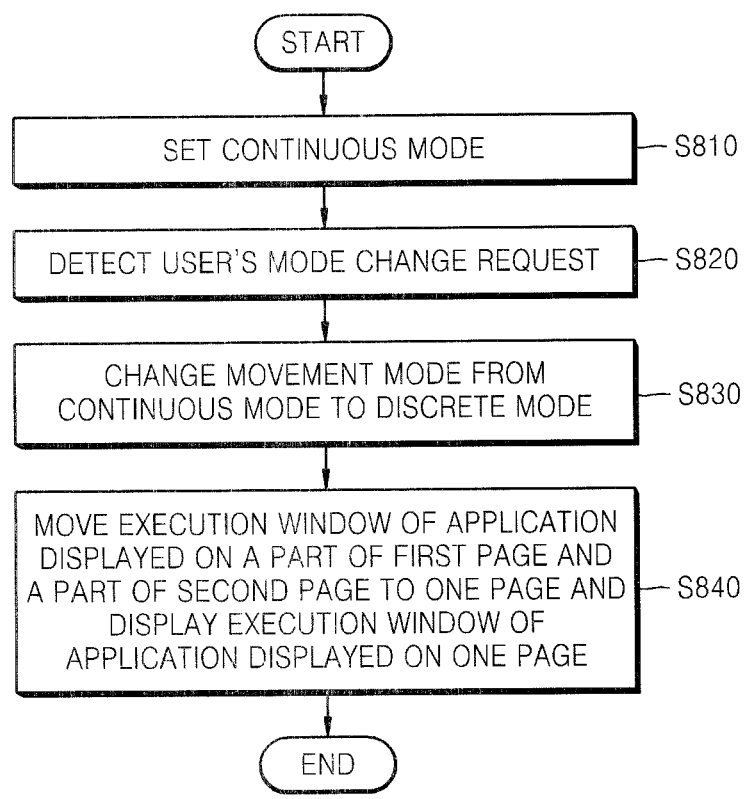
FIG. 8 is a flowchart illustrating an operation of changing a mode according to an exemplary embodiment of the present invention.

FIG. 8 is a flowchart illustrating an operation of changing a mode according to an exemplary embodiment of the present invention.

In operation S810, the terminal 100 may set a movement mode as a continuous mode based on a user's input that selects the movement mode as the continuous mode. In this case, when a user's drag input is detected, the terminal 100 may move a first page displayed on the screen and a second page connected to the first page and may display a part of the first page and a part of the second page together on the screen.

When a user's input that requests execution of at least one application is detected, the terminal 100 may display an execution window of at least one application on a part of the first page displayed on the screen and a part of the second page in response to the user's input (see FIGS. 6A through 6C).

In operation S820, the terminal 100 may detect a user's mode change request that changes the movement mode from the continuous mode to a discrete mode. In this case, in operation S830, the terminal 100 may change the movement mode from the continuous mode to the discrete mode in response to the user's mode change request.

In operation S840, the terminal 100 may move the execution window of the application displayed on a part of the first page and a part of the second page to one page and may display the execution window of the application displayed on one page. That is, the terminal 100 may select one of the first and second pages and may display the execution window of the application on one selected page.

In this case, the terminal 100 according to an exemplary embodiment of the present invention may select one of the first and second pages based on a first portion of the execution window of the at least one application displayed in the first page to a second portion of the execution window of the at least one application displayed in the second page. For example, when ⅔ of the execution window of the application is displayed on a part of the first page and ⅓ of the execution window of the application is displayed on a part of the second page, the terminal 100 may select the first page on which a relatively large part of the execution window of the application is displayed. Thus, the terminal 100 may move the execution window of the application displayed on the first page and the second page connected to the first page together on the screen in the continuous mode to the first page in the discrete mode and may display the execution window of the application only on the first page.

On the other hand, when the movement mode is changed from the continuous mode to the discrete mode, the terminal 100 according to an exemplary embodiment of the present invention may select one of the first and second pages displayed together on the screen and may display only one selected page on the entire region of the screen.

In this case, the terminal 100 may select one of the first and second pages based on the ratio of a part of the first page displayed on the screen to a part of the second page displayed on the screen. For example, the terminal 100 may select the first page displayed in a region corresponding to ¾ of the entire region of the screen and may display the first page on the entire region of the screen without displaying the second page when the movement mode is changed from the continuous mode into the discrete mode. The case that the movement mode is changed from the continuous mode to the discrete mode will be described in more detail with reference to FIG. 9.

FIGS. 9A through 9D are views illustrating movement of an execution window of an application when a continuous mode is changed into a discrete mode, according to an exemplary embodiment of the present invention.

Figure 9A:
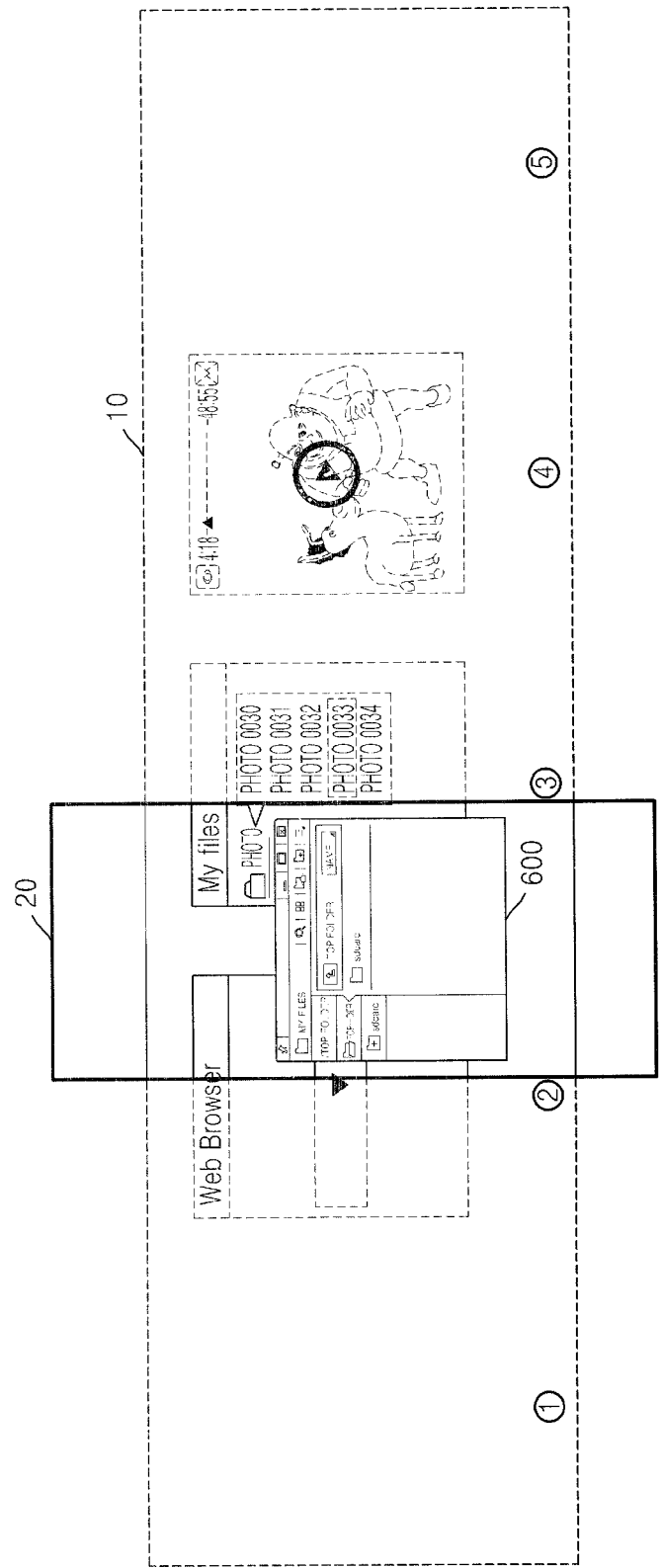
FIGS. 9A through 9D are views illustrating movement of an execution window of an application when a continuous mode is changed into a discrete mode, according to an exemplary embodiment of the present invention.

Referring to FIG. 9A, when a user's input that executes a new application 600 in the continuous mode is detected, a border between pages arranged in the logical space region 10 disappears, and the terminal 100 may display an execution window of the new application 600 on a part of the second page and a part of the third page displayed together on the physical display region 20 (see FIG. 6C).

Figure 9B:
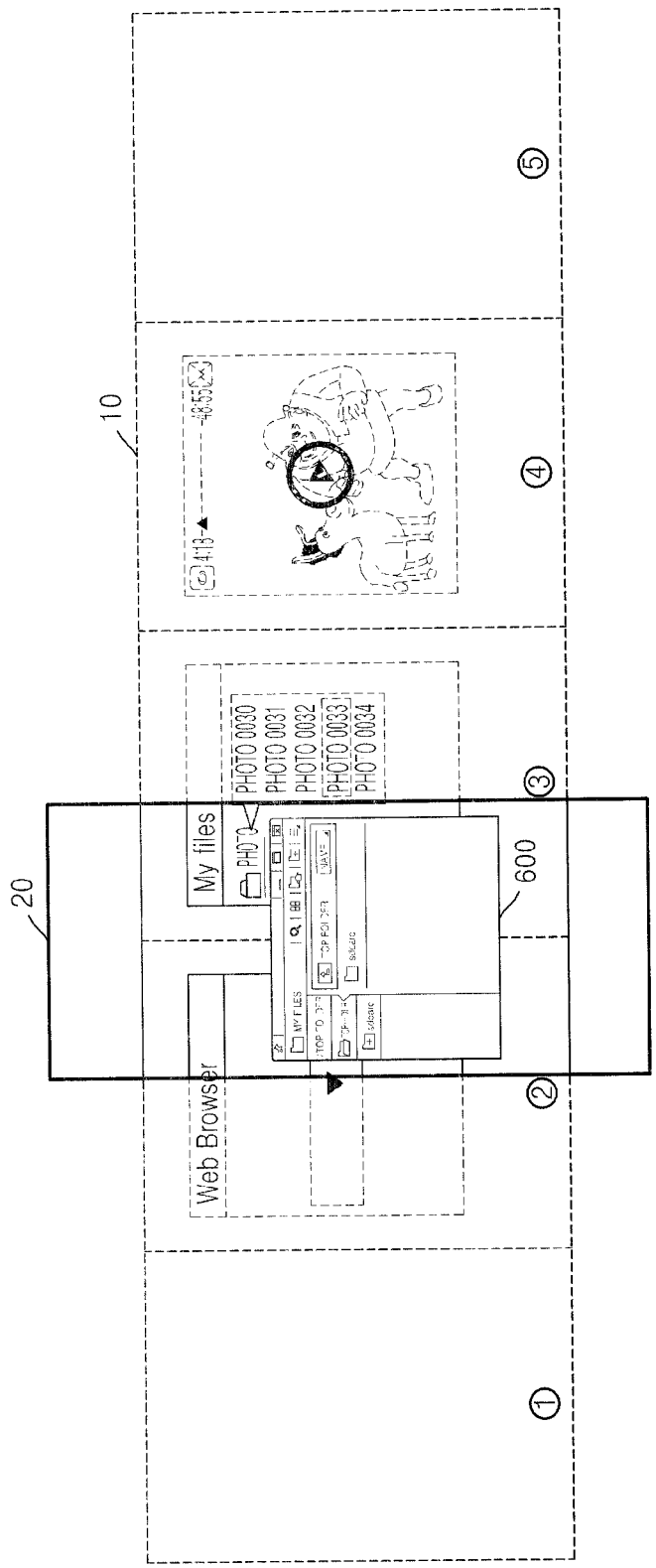

In this case, as illustrated in FIG. 9B, when a user's mode change request that changes the movement mode from the continuous mode to the discrete mode, the terminal 100 may change the movement mode from the continuous mode to the discrete mode, and a border between pages arranged in the logical space region 10 may be generated.

Figure 9C:
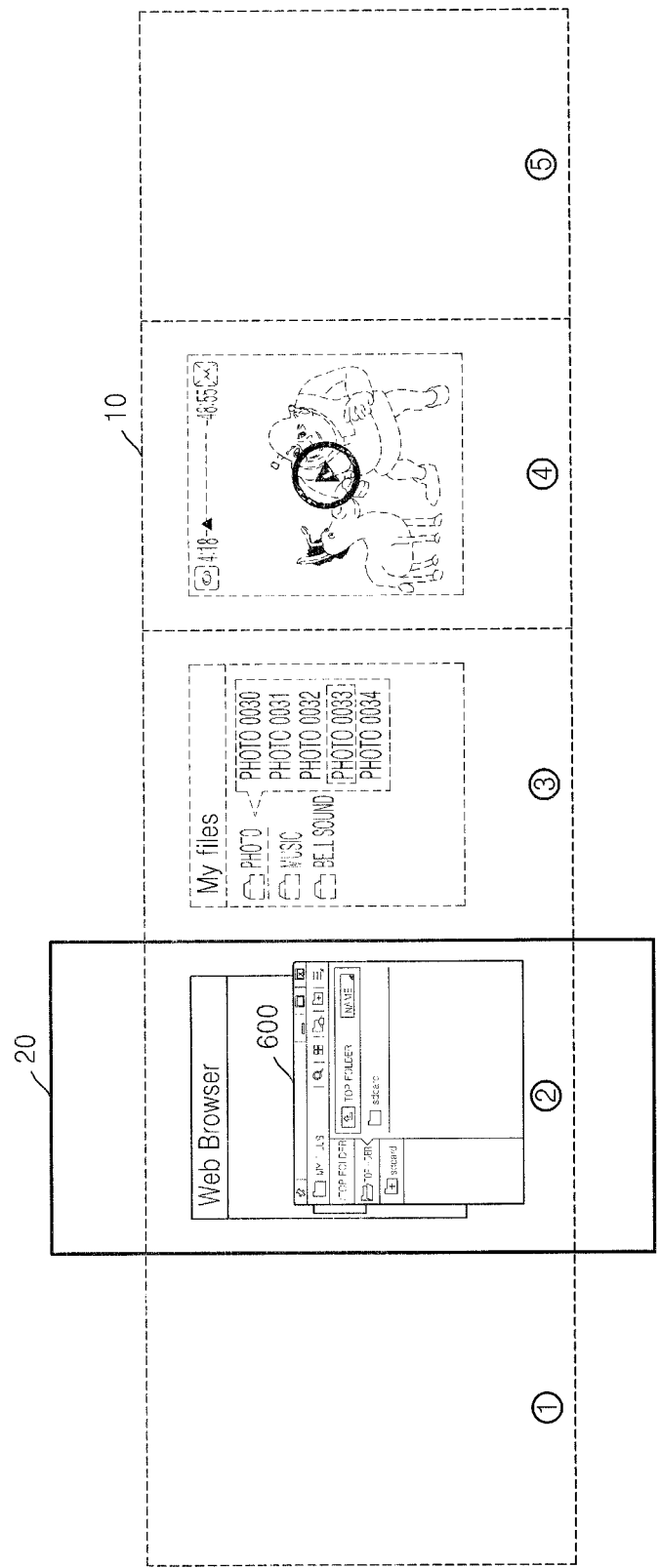

Thus, as illustrated in FIG. 9C, the terminal 100 may move the execution window of the application 600 to the second page and may display the whole part of the second page on which the execution window of the application 600 is displayed, in the physical display region 20 of the terminal 100. That is, when the movement mode is changed from the continuous mode to the discrete mode, the terminal 100 may select only one from a plurality of pages displayed in the physical display region 20 and may display one selected page in the physical display region 20.

Figure 9D:
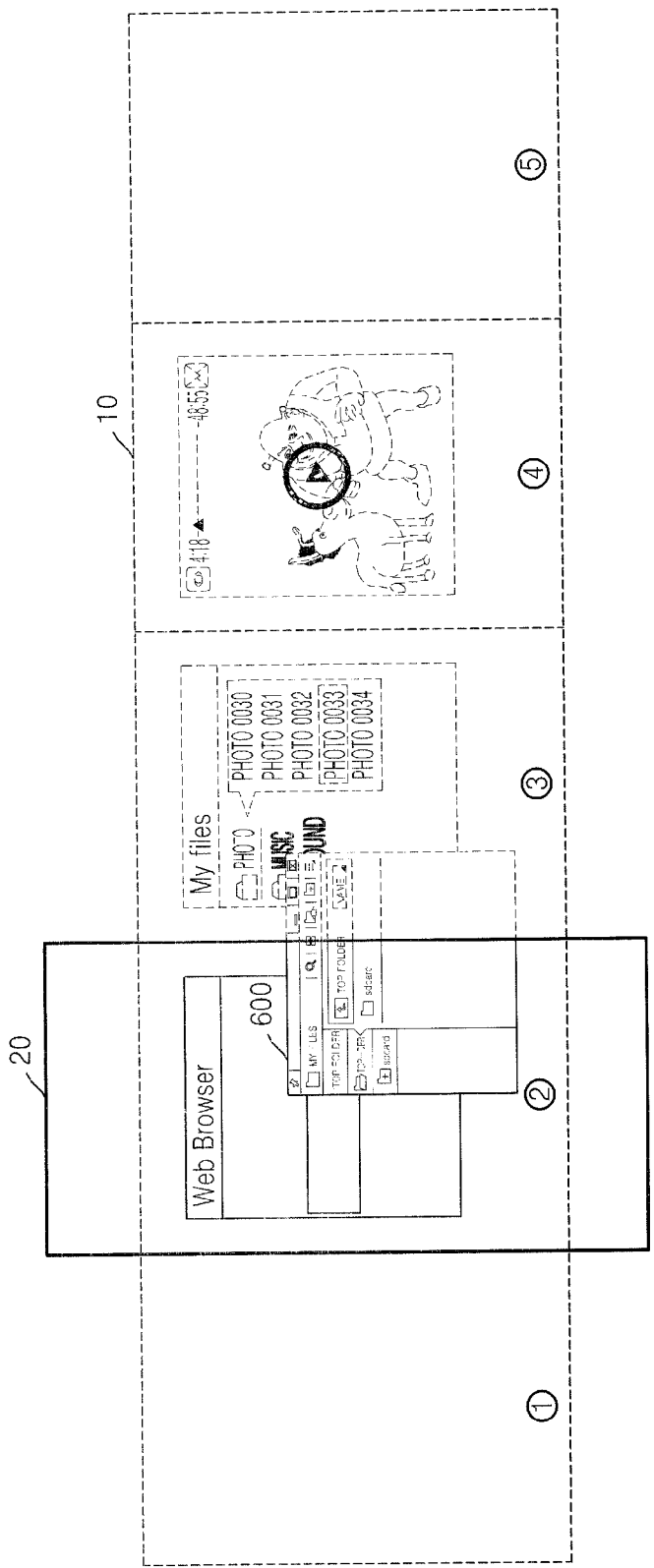

On the other hand, as illustrated in FIG. 9D, according to another exemplary embodiment of the present invention, the terminal 100 may not move the execution window of the application 600 displayed together on the second page and the third page to one page but may display the whole part of the second page in which a part of the execution window of the application 600 is included, in the physical display region 20 of the terminal 100. That is, the terminal 100 according to an exemplary embodiment of the present invention may display the execution window of the application 600 executed in the continuous mode together on the second page and the third page in the discrete mode. When the user drags the screen in the left direction, the terminal 100 may display the third page in which the other part of the execution window of the application 600 is included, in the physical display region 20.

In FIGS. 8 and 9A through 9D, the case that the movement mode is changed from the continuous mode to the discrete mode has been described. However, the movement mode may be changed from the discrete mode to the continuous mode. When the movement mode is changed from the discrete mode to the continuous mode, a border between pages in the discrete mode disappears, and an execution window of at least one application displayed on each page may be moved in units of pixel. Also, the execution window of the application that is to be newly executed in the continuous mode may be displayed on a border between a plurality of pages.

Figure 10:
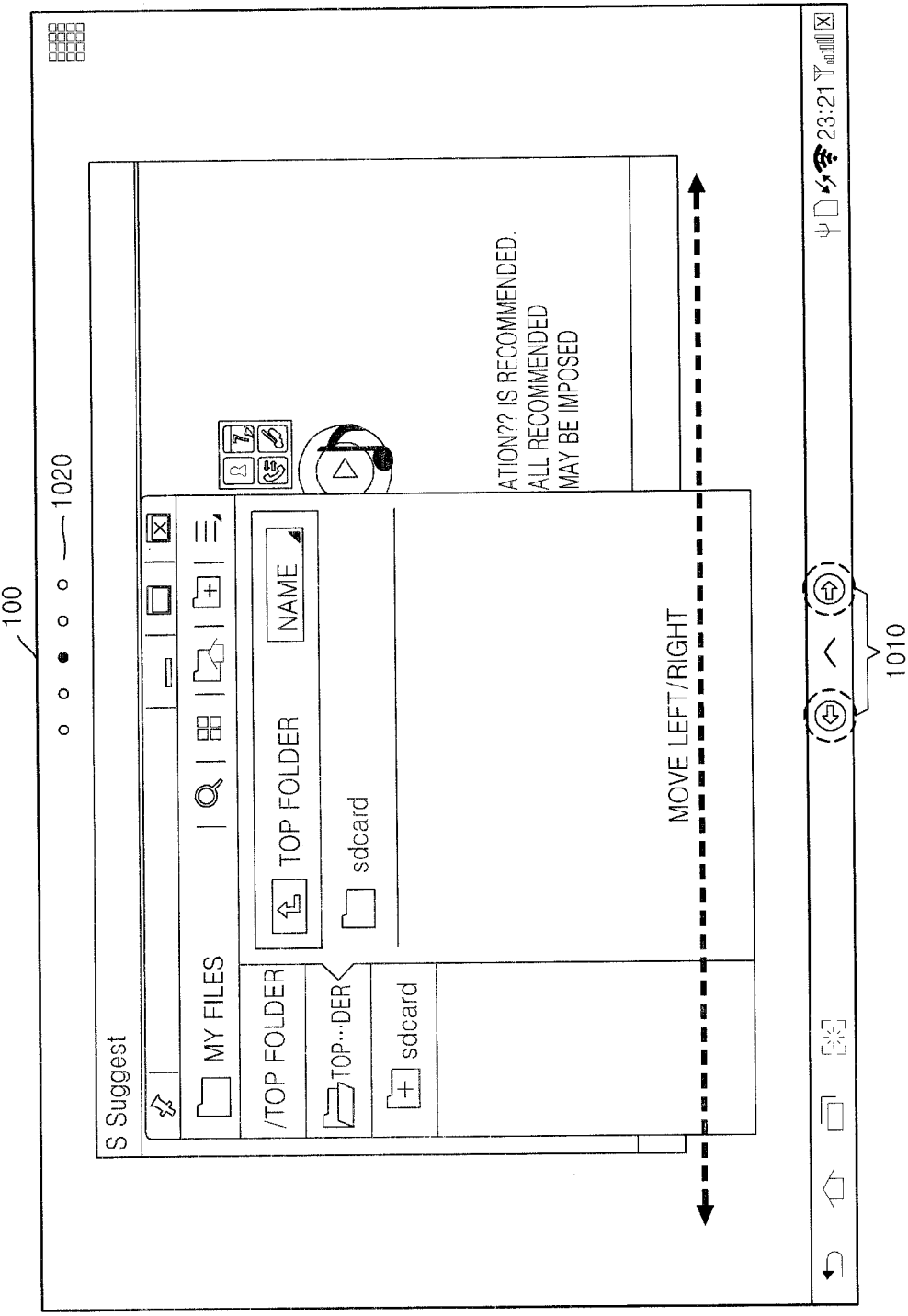
FIG. 10 is a view of a Graphical User Interface (GUI) for moving a plurality of pages according to an exemplary embodiment of the present invention.

FIG. 10 is a view of a Graphical User Interface (GUI) for moving a plurality of pages according to an exemplary embodiment of the present invention.

Referring to FIG. 10, according to the present exemplary embodiment, the user touches the GUI 1010 through which a plurality of pages is moved, and the user also performs a drag operation so that a desired page may be displayed on the screen.

The terminal 100 may provide a discrimination indication 1020 for discriminating a page that is currently displayed on the screen from another page. For example, according to the discrimination indication 1020 of FIG. 10, there may be 5 pages displayed as the entire page, and the page currently displayed on the screen may be the third page.

Figure 11:
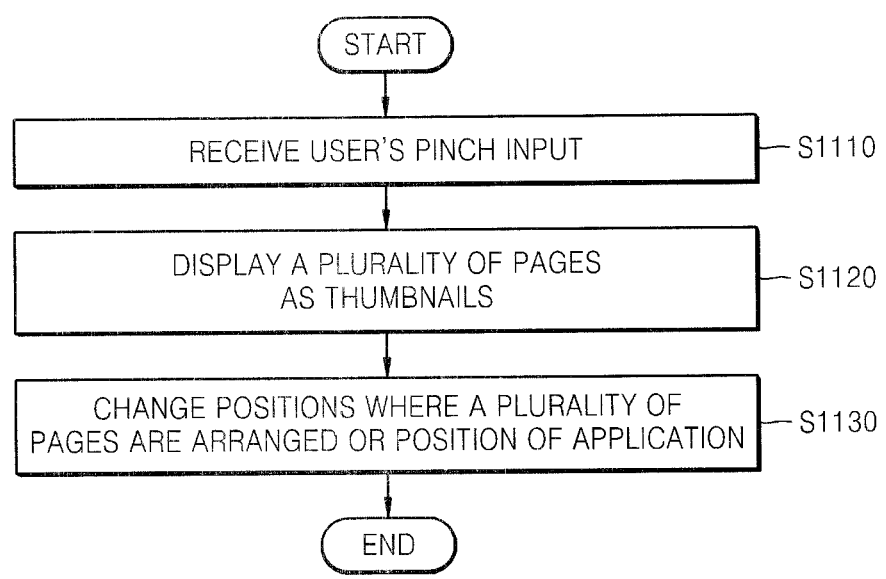
FIG. 11 is a flowchart illustrating a method of editing a plurality of pages according to an exemplary embodiment of the present invention.

FIG. 11 is a flowchart illustrating a method of editing a plurality of pages according to an exemplary embodiment of the present invention.

In operation S1110, the terminal 100 may receive a user's pinch input. For example, when the user touches two points of the screen by using two fingers and then drags the fingers on the screen in different directions, the terminal 100 may sense that a pinch event occurs.

In operation S1120, the terminal 100 may display a plurality of pages in the form of thumbnails. In this case, the terminal 100 may arrange the thumbnails of the plurality of pages in the order in which the plurality of pages is arranged on the logical space region 10 (see FIG. 1). The thumbnails may be images in which the sizes of the plurality of pages including the application are reduced at a predetermined ratio In operation S1130, the terminal 100 may change positions where the plurality of pages is arranged or the position of an application.

For example, the terminal 100 may change the positions where the plurality of pages is arranged as one page is selected from among the plurality of pages displayed as thumbnails and a drag & drop operation is performed on the selected page.

In addition, the terminal 100 may move the selected application from a first page to a second page as an application displayed on the first page among the plurality of pages displayed in the form of thumbnails is selected and a drag & drop operation is performed on the second page. In this case, the selected application may be displayed on the second page. Moving the application according to the present exemplary embodiment may refer to moving an application execution window in which the application is executed.

This will be described with reference to FIGS. 12A and 12B in more detail.

FIGS. 12A and 12B are views of screens on which a plurality of pages is displayed as thumbnails according to an exemplary embodiment of the present invention.

As illustrated in FIG. 12A, the terminal 100 may receive a user's pinch input on the screen.

In this case, as illustrated in FIG. 12B, the terminal 100 may provide an editing mode by displaying all of the plurality of pages as thumbnails on the screen. When the user drags a fourth page in a direction of a first page while touching the fourth page and drops the fourth page at the position of the first page, the terminal 100 may change the arrangement position of the fourth page into the position of the first page and may display the fourth page in operation 1210.

In addition, when the user touches a header of a predetermined application included in a third page for a predetermined amount of time and selects the header and then performs a drag & drop operation on a fifth page, the terminal 100 may move the predetermined application included in the third page to the fourth page and may display the application in operation 1220.

In the editing mode, the user may delete a particular page (or application) in operation 1230 or may add a new page in operation 1240. In addition, when the user touches a home button 1250 displayed at a second page, the terminal 100 may terminate the editing mode and may display the second page in the entire region of the screen.

Figure 13:
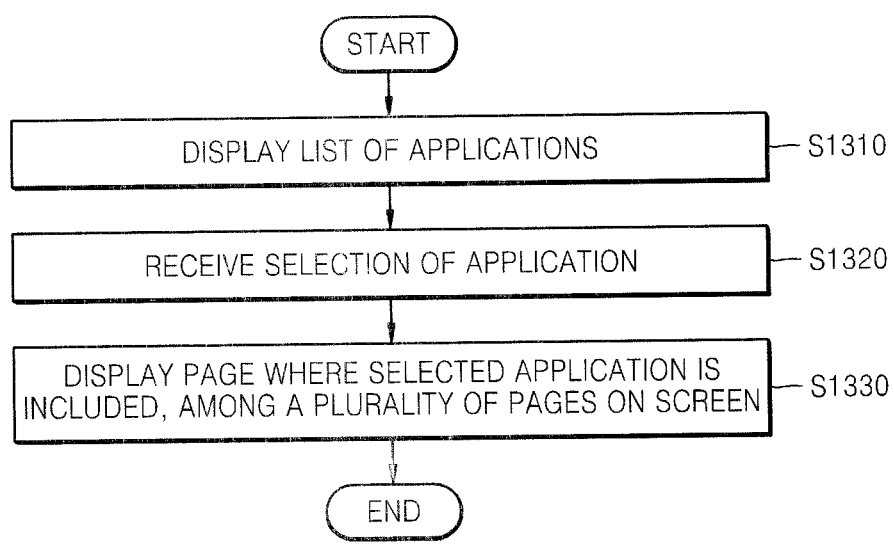
FIG. 13 is a flowchart illustrating a method of displaying a page in which an application selected by a user is included, according to an exemplary embodiment of the present invention.

FIG. 13 is a flowchart illustrating a method of displaying a page in which an application selected by a user is included, according to an exemplary embodiment of the present invention.

In operation S1310, the terminal 100 may display the list of at least one application that is executed on the terminal 100 on the screen. In this case, the list of at least one application may be displayed in the form of an icon indicating applications. In addition, the list of at least one application may be displayed as screen shots of at least one page in which at least one application is executed.

According to the present exemplary embodiment, the terminal 100 may display the list of at least one application on a home screen, or when the user touches (taps) a particular GUI or a particular region of the screen (for example, the bottom of the screen), the terminal 100 may display the list of at least one application on a part of the screen.

In operation S1320, the terminal 100 may receive selection of at least one application from the list of at least one application. In this case, in operation S1330, the terminal 100 may display a page in which the selected application is included on the screen of the terminal 100. This will be described with reference to FIGS. 14A and 14B.

Figure 14:
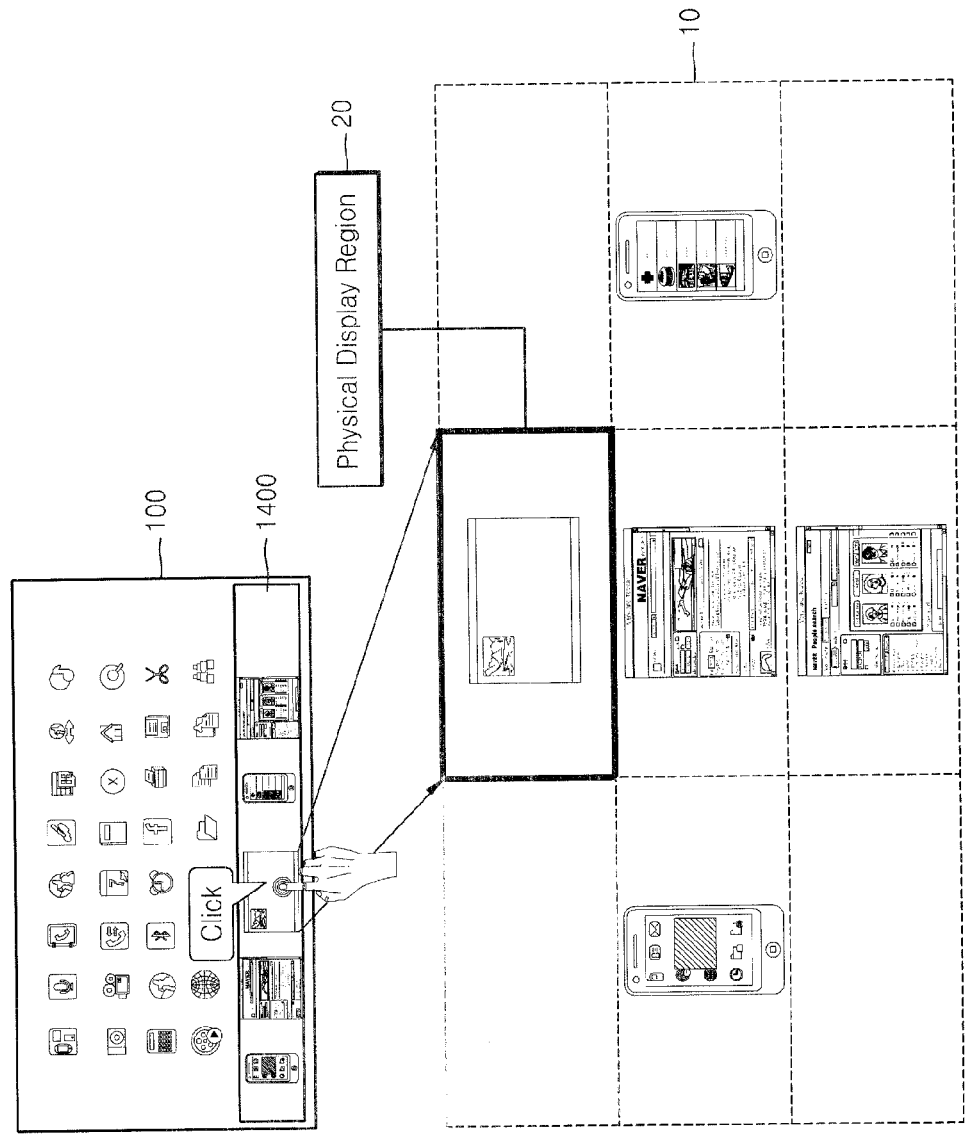
FIGS. 14A and 14B are views of screens on which the list of a plurality of applications is displayed, according to another exemplary embodiment of the present invention.

FIGS. 14A and 14B are views of screens on which the list of a plurality of applications is displayed, according to an exemplary embodiment of the present invention.

As illustrated in FIG. 14A, according to the present exemplary embodiment, the terminal 100 may display a list of applications 1400 that are being executed on the bottom of the screen. As illustrated in FIG. 14B, when the user selects a third application from the list of applications 1400 among the applications arranged in the logical display region 10, the terminal 100 may display a page in which the third application is included in the entire region of the screen displaying the physical display region 20.

Thus, according to the present exemplary embodiment, the user may search for a desired particular page quickly from a plurality of pages in which applications are executed.

Figure 15:
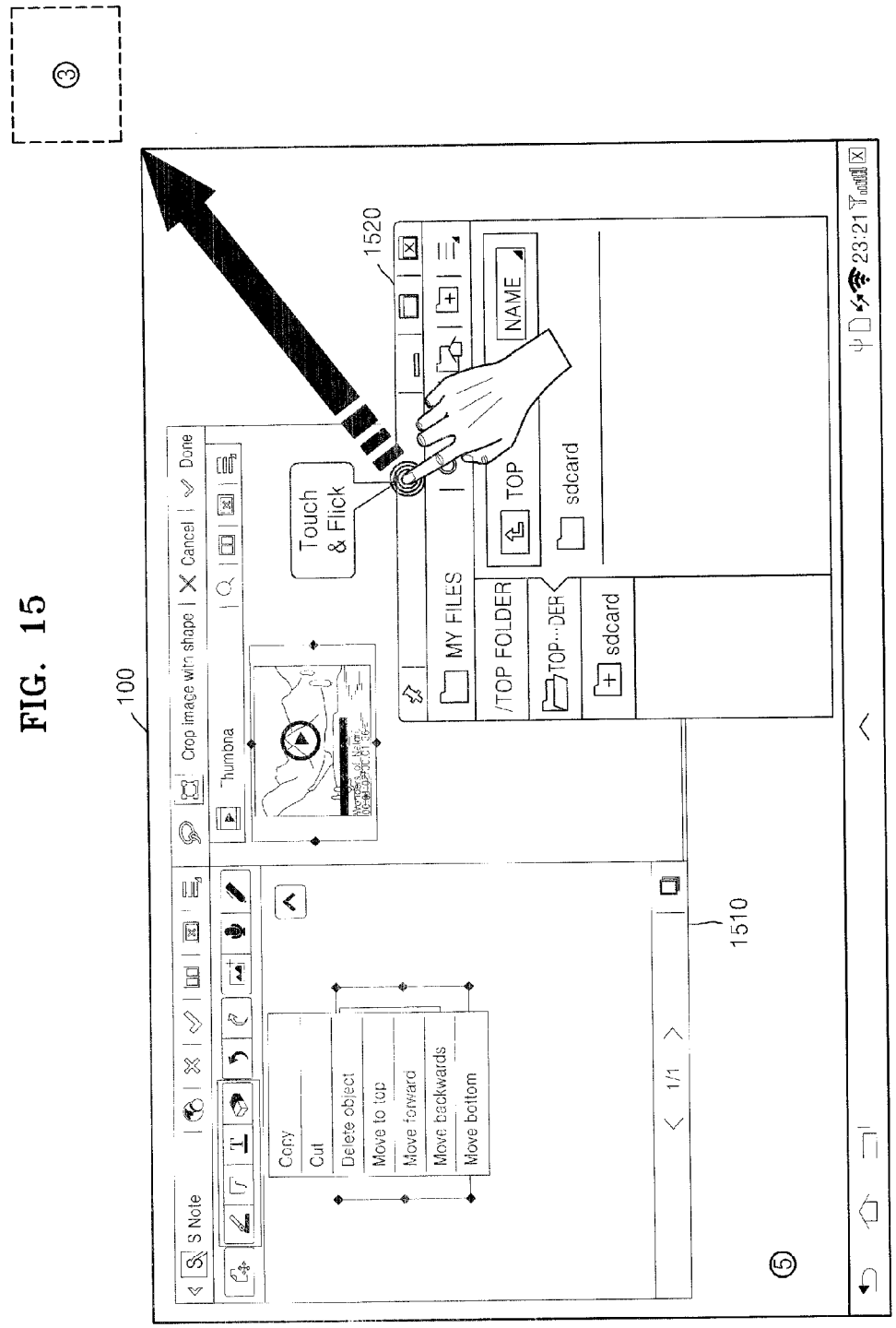
FIG. 15 is a view of a user's input that allows an application displayed on a screen to be moved to another page, according to an exemplary embodiment of the present invention.

FIG. 15 is a view of a user's input that allows an application being displayed on a screen to be moved to another page, according to an exemplary embodiment of the present invention.

According to the present exemplary embodiment, as an application included in a page displayed on the screen is executed and flicked, the terminal 100 may move the selected application from the page displayed on the screen to a connected page. In this case, the terminal 100 may display a page to which the application is moved, on the screen and may display the current page continuously.

For example, as illustrated in FIG. 15, the terminal 100 may display a fifth page including windows in which a memo application 1510 and an application 1520 for providing the list of files are to be executed on the screen. In this case, when the user touches a header of the application 1520 for providing the list of files and then flicks the header, the terminal 100 may move the application 1520 for providing the list of files to a third page connected to the fifth page in a direction of flick.

Figure 16:
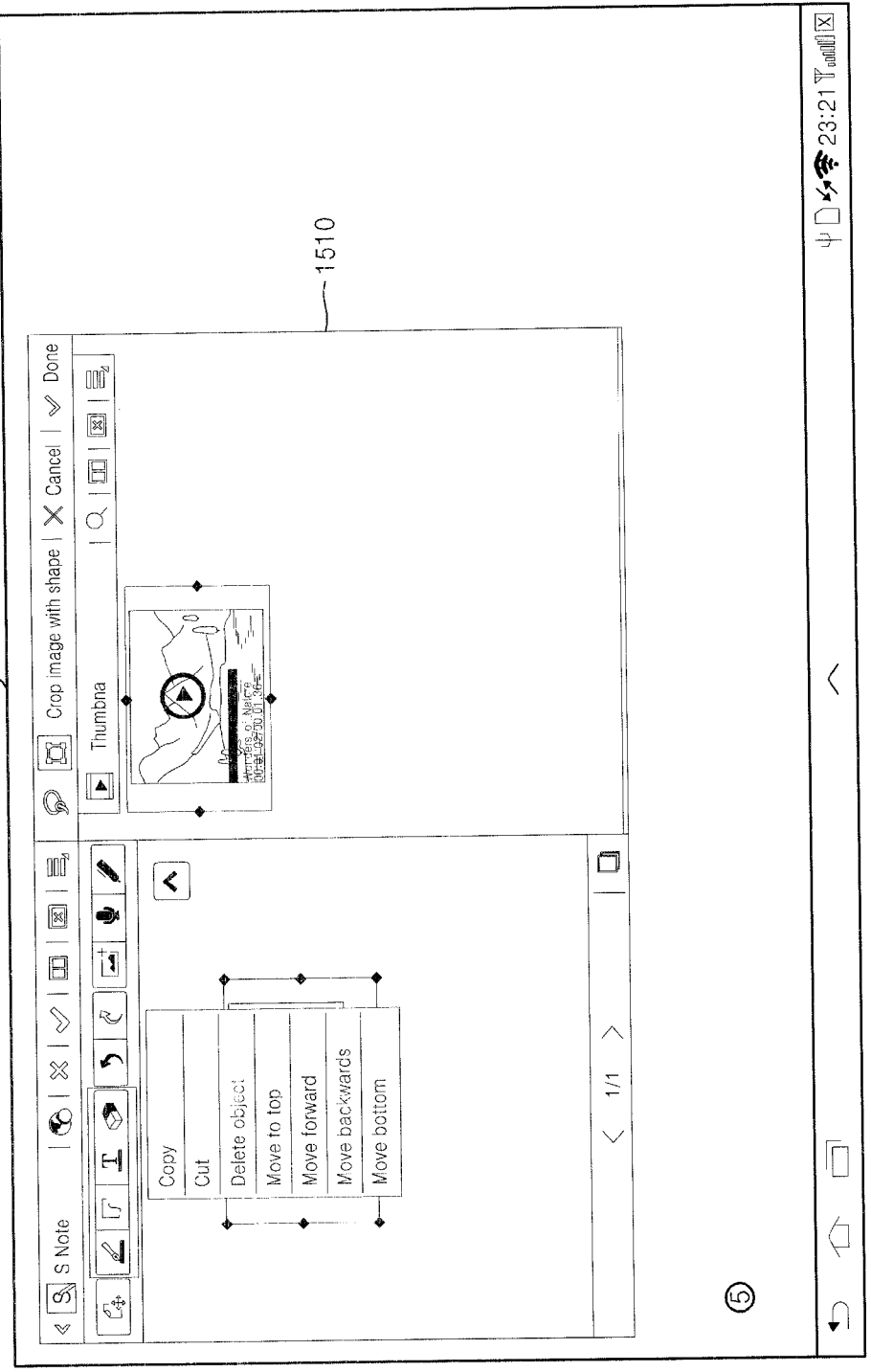
FIG. 16 is a view of a result of a screen on which an application displayed on the screen is moved to another page, according to an exemplary embodiment of the present invention.

FIG. 16 is a view of a result of a screen on which an application being displayed on the screen is moved to another page, according to an exemplary embodiment of the present invention.

Referring to FIG. 16, according to the present exemplary embodiment, the terminal 100 may delete the execution window of the application 1520 for providing the list of files from the fifth and may display the fifth page in which only the memo application 1510 is included.

Figure 17:
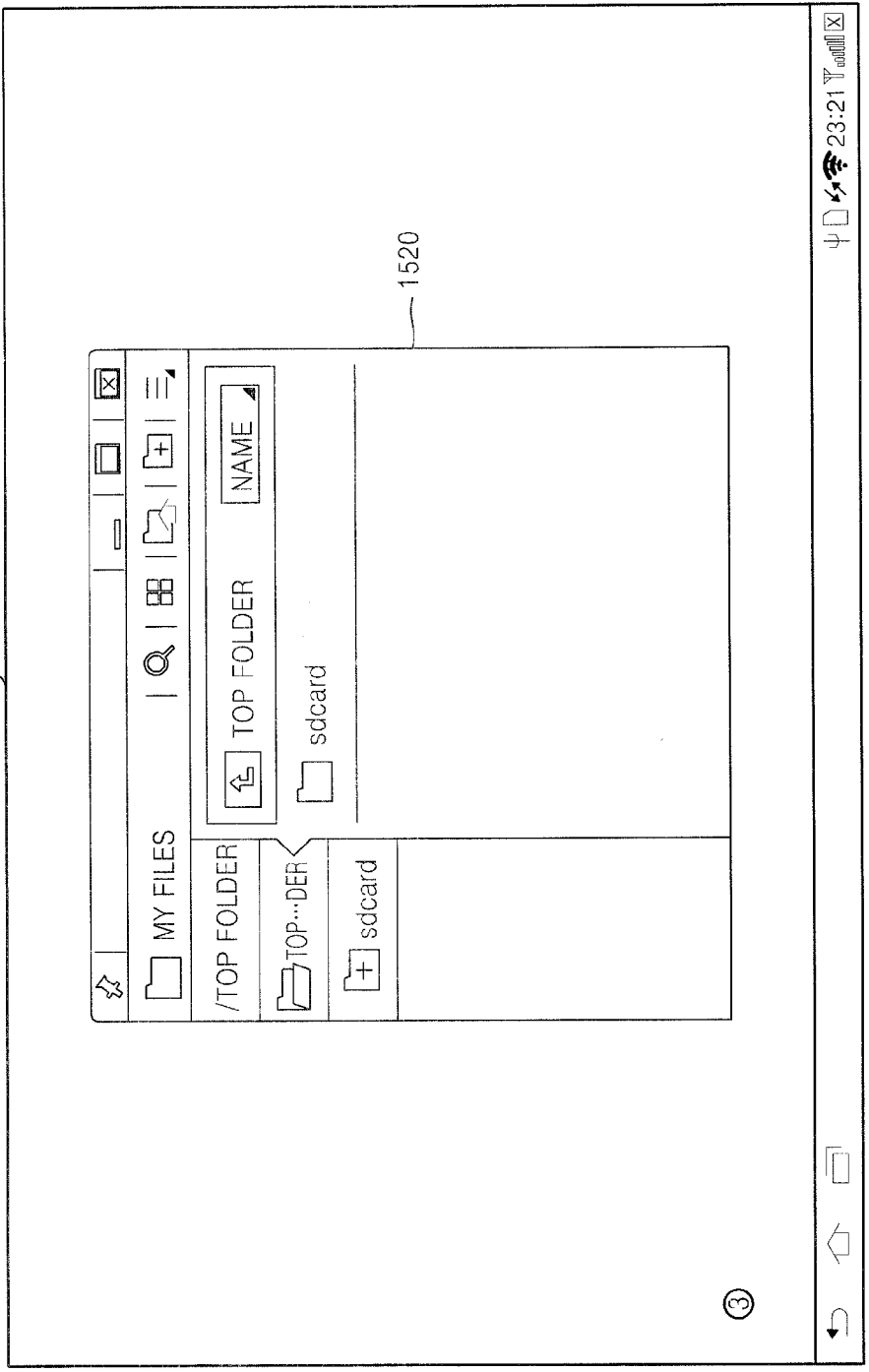
FIG. 17 is a view of a screen on which a page to which an application is moved, according to an exemplary embodiment of the present invention.

FIG. 17 is a view of a screen on which a page to which an application is moved, according to an exemplary embodiment of the present invention.

In addition, as illustrated in FIG. 17, according to the present exemplary embodiment, when the application 1520 for providing the list of files is moved to the third page, the terminal 100 may display the third page including the application 1520 for providing the list of files on the entire screen.

Thus, according to the present exemplary embodiment, the user may conveniently move a particular application to a particular page.

Figure 18:
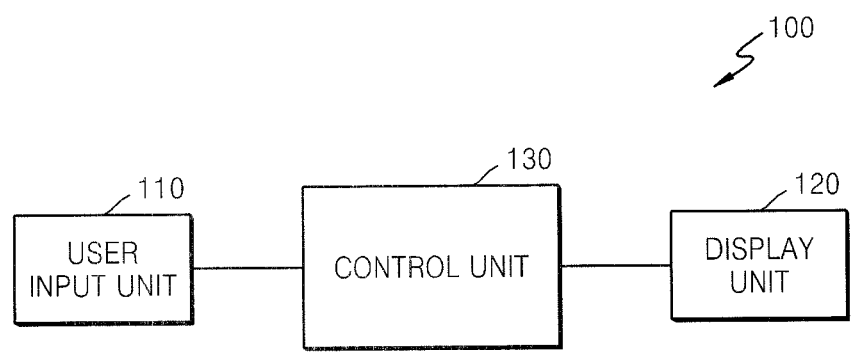
FIG. 18 is a block diagram illustrating a terminal according to an exemplary embodiment of the present invention.

FIG. 18 is a block diagram illustrating a terminal according to an exemplary embodiment of the present invention.

Referring to FIG. 18, the terminal 100 may include a user input unit 110, a display unit 120, and a control unit 130. However, not all of the elements are essential elements. The terminal 100 may be implemented with more or less elements than the elements shown in FIG. 18.

Hereinafter, the above-described elements will be sequentially described.

The user input unit 110 is a unit that allows a user to input data for controlling the terminal 100. The user input unit 110 may include a key pad, a dome switch, a touch pad (e.g., a contact type electrostatic capacitive method, a pressure resistive layer method, an infrared ray sensing method, a surface ultrasonic wave conduction method, an integration type tension measurement method, a piezo effect method, or the like), a jog wheel, a jog switch, or the like. In particular, when the touch pad configures a layer structure with the display unit 120 that is described below, the touch pad may be referred to as a touch screen.

The user input unit 110 may receive a user's gesture (for example, a drag gesture, a tap gesture, a flick gesture, or the like) on the screen (or page displayed on the screen). In addition, the user input unit 110 may receive a user's pinch input on the screen (or page displayed on the screen).

The user input unit 110 may receive a selection of at least one application from the list of applications.

The display unit 120 displays information processed by the terminal 100.

For example, the display unit 120 may display a plurality of pages including execution windows of the applications on the screen.

According to the present exemplary embodiment, when the display unit 120 and the touch pad have a layer structure and are configured as a touch screen, the display unit 120 may be used as an input unit, as well as an output unit. The display unit 120 may include at least one selected from the group including a Liquid Crystal Display (LCD), a thin film transistor-liquid crystal display, an organic light-emitting diode, a flexible display, a 3-Dimensional (3D) display, an electrophoretic display, etc.

The touch screen may be configured to detect a touch input position, a touched area, and a touch input pressure. In addition, the touch screen may be configured to detect a proximity touch as well as a real-touch.

In the present disclosure, a "real-touch" refers to the case where the screen is actually touched by a pointer, and a "proximity-touch" refers to the case where the screen is not actually touched by the pointer and the pointer remains spaced apart from the screen by a predetermined distance. In the present disclosure, the pointer refers to an instrument for performing a real-touch or proximity-touch on a particular portion of a displayed screen, for example, a stylus pen, a finger, and the like.

Although not shown, various sensors may be disposed inside or in the vicinity of the touch screen so as to sense a real-touch or a proximity-touch on the touch screen. A tactile sensor is an example of a sensor for sensing a touch on the touch screen.

The tactile sensor refers to a sensor for sensing a touch on a particular object at the same degree of human feeling or higher. The tactile sensor may sense various information, such as roughness of a touch face, hardness of a touched object, temperature of a touch point, and the like.

A proximity sensor is an example of a sensor for sensing a touch of the touch screen.

The proximity sensor refers to a sensor that detects whether an object approaches a predetermined detection face or an object exists in the vicinity of the predetermined detection face by using a force of an electronic system or infrared rays without any mechanical touch. Thus, the proximity sensor has a considerably longer life span than the tactile sensor, and its utility is considerably higher than that of the tactile sensor.

Examples of proximity sensors include a transmissive photoelectric sensor, a direct reflective photoelectric sensor, a mirror reflective photoelectric sensor, a radio frequency oscillation proximity sensor, an electrostatic capacitive proximity sensor, a magnetic proximity sensor, an infrared ray proximity sensor, and the like.

The display unit 120 may move and display a page displayed on the screen and a page connected to the page displayed on the screen according to an identified movement mode.

For example, when the identified movement mode is a discrete mode, the display unit 120 may move a plurality of pages one by one so that a page connected to the page displayed on the screen may be displayed in the entire region of the screen. That is, when the user drags or flicks the page displayed on the screen, the user may identify the previous or next page.

In addition, when the identified movement mode is a continuous mode, the display unit 120 may move the page displayed on the screen and the connected page by the dragged length continuously and may display a part of the page displayed on the screen and a part of the connected page together on the screen. That is, the user drags an object on the screen so that the page displayed on the screen and the connected page may be continuously identified.

When a user's pinch input on the screen is received, the display unit 120 may display all of a plurality of pages in the form of thumbnails on the screen. That is, the display unit 120 may display the list of at least one application that is executed on the terminal 100, on the screen.

According to the present exemplary embodiment, when a selection of at least one application from the list of at least one application is received, the display unit 120 may display a page in which the selected application is included, from among the plurality of pages on the screen of the terminal 100.

When the page in which the selected application is included, is moved, the display unit 120 may display a page including the moved application on the screen.

The control unit 130 controls the overall operation of the terminal 100. For example, the control unit 130 may control the user input unit 110, the display unit 120, and a memory (not shown).

The control unit 130 may identify a movement mode relating to movement of a page displayed on the screen. The movement mode according to the present exemplary embodiment may include a discrete mode and a continuous mode. Thus, when a user's drag input is received, the control unit 130 may identify whether a predetermined movement mode is a discrete mode or a continuous mode.

The control unit 130 may also identify the movement mode based on the drag input. For example, when the drag input is a one-finger drag input, the control unit 130 may determine the movement mode as a discrete mode, and when the drag input is a two-finger drag input, the control unit 130 may determine the movement mode as a continuous mode. However, aspects of the present invention are not limited thereto.

The control unit 130 may determine the size of a part of the page displayed on the screen and the size of a part of the connected page based on the length of the drag input so as to display the determined sizes on the screen. The control unit 130 may set a movement mode in advance based on the user input.

As one page is selected from among a plurality of pages displayed in the form of thumbnails and is dragged and dropped, the control unit 130 may change positions where the plurality of pages is arranged. As an application displayed at a first page among the plurality of pages displayed in the form of thumbnails is selected and is dragged and dropped to a second page, the control unit 130 may move the selected application from the first page to the second page and may display the application on the screen.

As the application included in the page displayed on the screen is selected and flicked, the control unit 130 may move the selected application from the page displayed on the screen to the connected page.

The terminal 100 may further include a memory (not shown). The memory (not shown) may store a program for processing and controlling of the control unit 130 and may perform a function of temporarily storing input/output data.

The memory (not shown) may include at least one storage medium selected from the group consisting of flash memory, hard disk type memory, multimedia card micro type memory, card type memory (for example, SD memory, XD memory, or the like), Random Access Memory (RAM), Static RAM (SRAM), Read-Only Memory (ROM), Electrically Erasable Programmable Read-Only Memory (EEPROM), Programmable ROM (PROM), magnetic memory, a magnetic disk, an optical disk, etc. In addition, the terminal 100 may operate as a web storage for performing a storing function on the Internet.

According to an exemplary embodiment of the present invention, if a plurality of applications is executed by a user's input, an application that has been previously executed than an application that is currently executed is in a standby state. In other words, a plurality of applications other than the application currently executed is maintained in a pause state where execution of the plurality of applications stops.

Execution of the applications, i.e., the applications in the standby state, stops while a snap shot of their own execution screen before being in the pause state is displayed. In other words, if the user wants to change one from among the plurality of applications, a terminal should change an application that is currently executed into an application in the pause state and should execute the application to be changed. Thus, an operation of the application cannot be continuously performed.

Figure 19:
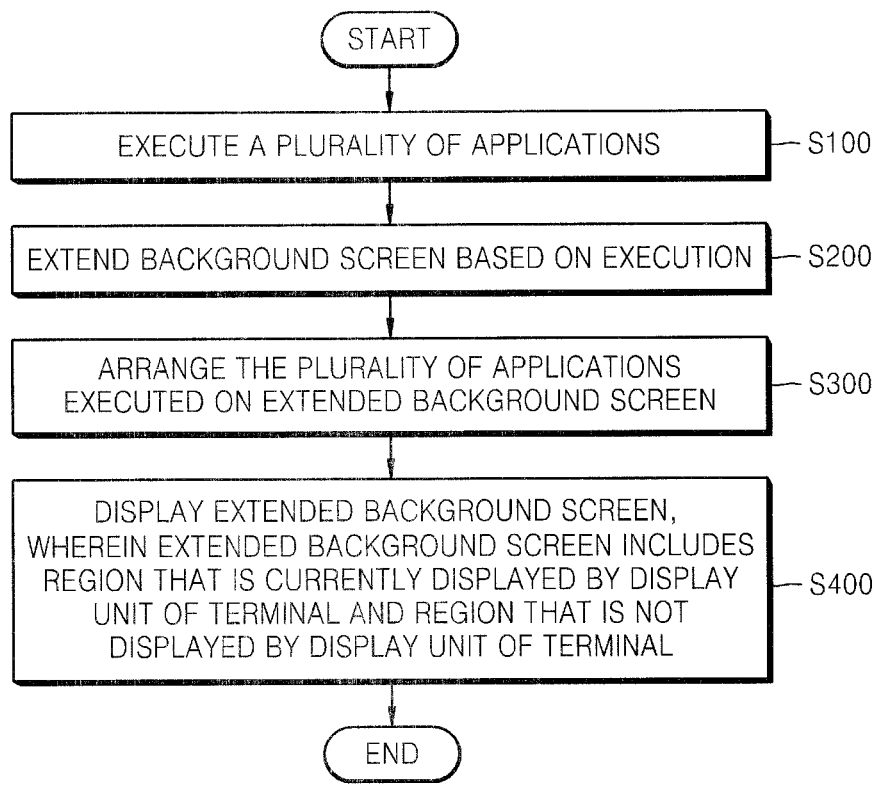
FIG. 19 is a flowchart illustrating a method of displaying a plurality of applications being executed on a terminal, according to an exemplary embodiment of the present invention.

FIG. 19 is a flowchart illustrating a method of displaying a plurality of applications being executed on a terminal, according to an exemplary embodiment of the present invention.

Hereinafter, displaying or arranging a plurality of applications may mean that execution windows of a plurality of applications is displayed or arranged.

A terminal according to an exemplary embodiment of the present invention may include a mobile phone, a Personal Digital Assistant (PDA), a smartphone, or a tablet computer that includes a Central Processing Unit (CPU) and a data storage device, such as memory, and that is capable of performing wired or wireless communication.

Referring to FIG. 19, the method of displaying a plurality of applications being executed on a terminal according to the current exemplary embodiment of the present invention may include executing a plurality of applications in operation S100, extending a background screen based on the execution in operation S200, arranging the plurality of applications executed on the extended background screen in operation S300, and displaying the extended background screen in operation S400. Here, the extended background screen includes a region that is currently displayed by a display unit of the terminal and a region that is not displayed by the display unit of the terminal.

According to an exemplary embodiment of the present invention, executing the plurality of applications may refer to a state where the applications are currently executed on the terminal. In other words, all of the plurality of applications may be applications that are being executed. For example, the plurality of applications may be simultaneously executed. Also, the plurality of applications according to an exemplary embodiment of the present invention may be executed sequentially or at one time.

Figure 20:
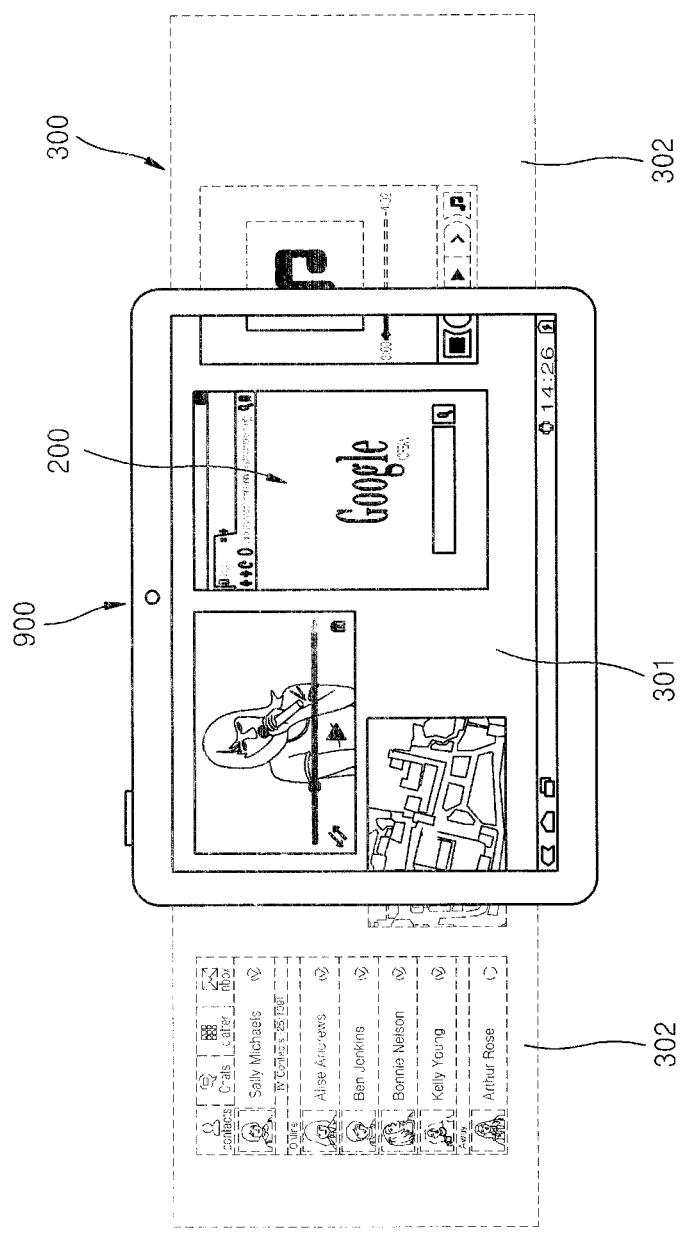
FIG. 20 is a view of a screen on which a plurality of applications being executed on a terminal are displayed, according to an exemplary embodiment of the present invention.

FIG. 20 is a view of a screen on which a plurality of applications being executed on a terminal are displayed, according to an exemplary embodiment of the present invention.

Referring to FIG. 20, an extended background screen 300 according to the current exemplary embodiment of the present invention may include a region 301 that is currently displayed by a display unit of the terminal 900 that will be described below and a region 302 that is not displayed by the display unit of the terminal 900. The extended background screen 300 of FIG. 20 may be the virtualized logical space region 10 described above.

Extending the background screen in operation S200 of FIG. 19 may include extending the background screen from the currently-displayed region 301 in a predetermined direction as the plurality of applications is executed.

The predetermined direction in which the background screen is extended, may include at least one selected from the group consisting of a vertical direction, a horizontal direction, and a diagonal direction.

Also, arranging the plurality of applications executed on the extended background screen 300 in operation S300 of FIG. 19 may include arranging execution screens of the plurality of applications executed on the extended background screen 300 according to a predetermined criterion. The predetermined criterion may include at least one of the order in which the plurality of applications is executed, and types of the plurality of applications.

For example, when one application that is a single application is executed, a background screen having the size corresponding to the currently-displayed region 301 may be used. That is, one application may be displayed on the entirety of the screen of the display unit of the terminal 900.

A background screen according to an exemplary embodiment of the present invention may be the background screen 300 that is extended in at least one selected from the group consisting of a vertical direction, a horizontal direction, and a diagonal direction as the plurality of applications is executed.

As described above, executing the plurality of applications may include starting operations of the plurality of applications and maintaining all of the applications in an executed state.

For example, if two applications are executed, the currently-displayed region 301 may include an entire execution screen of a first application. In this case, a second application may be arranged in the undisplayed region 302.

Also, as illustrated in FIG. 20, the currently-displayed region 301 may include the entire execution screen of the first application 200 and a part of an execution screen of the second application.

According to an exemplary embodiment of the present invention, arranging execution screens of the plurality of applications on the extended background screen 300 according to the predetermined criterion may include arranging the execution screens of the plurality of applications on the extended background screen 300 according to the order in which the plurality of applications is executed, or types of the plurality of applications.

For example, the plurality of applications may be arranged according to the order in which the plurality of applications is executed, while moving from the left to the right of the extended background screen 300.

Also, applications for playing media contents, such as movie, music, and the like, may be arranged in a particular region of the extended background screen 300. For example, applications for seeing a movie or for listening to the music may be preset to be arranged on the top or bottom of the extended background screen 300.

Also, an application having the highest preference may be first arranged on the extended background screen 300 according to preferences of applications that can be known by a user's use frequency of the applications, and the other applications may be arranged on the extended background screen 300 according to rankings of the other preferences.

Figure 21:
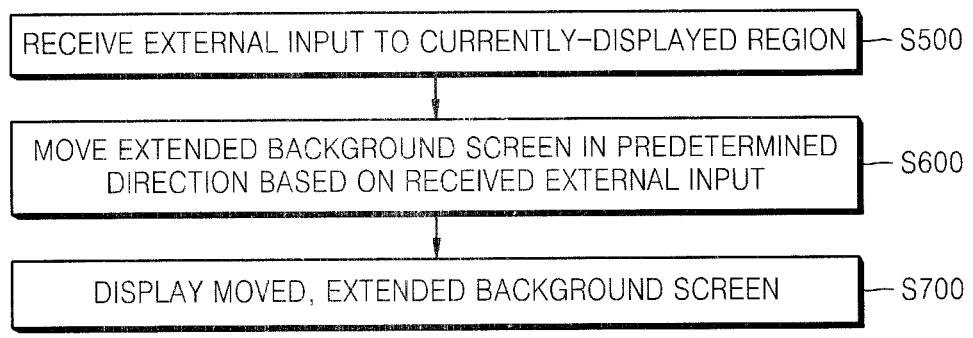
FIG. 21 is a flowchart illustrating an operation of displaying an extended background screen by changing a region currently displayed as the extended background screen is moved, according to an exemplary embodiment of the present invention.

FIG. 21 is a flowchart illustrating an operation of displaying an extended background screen by changing a currently-displayed region as the extended background screen is moved, according to an exemplary embodiment of the present invention.

Figure 22:
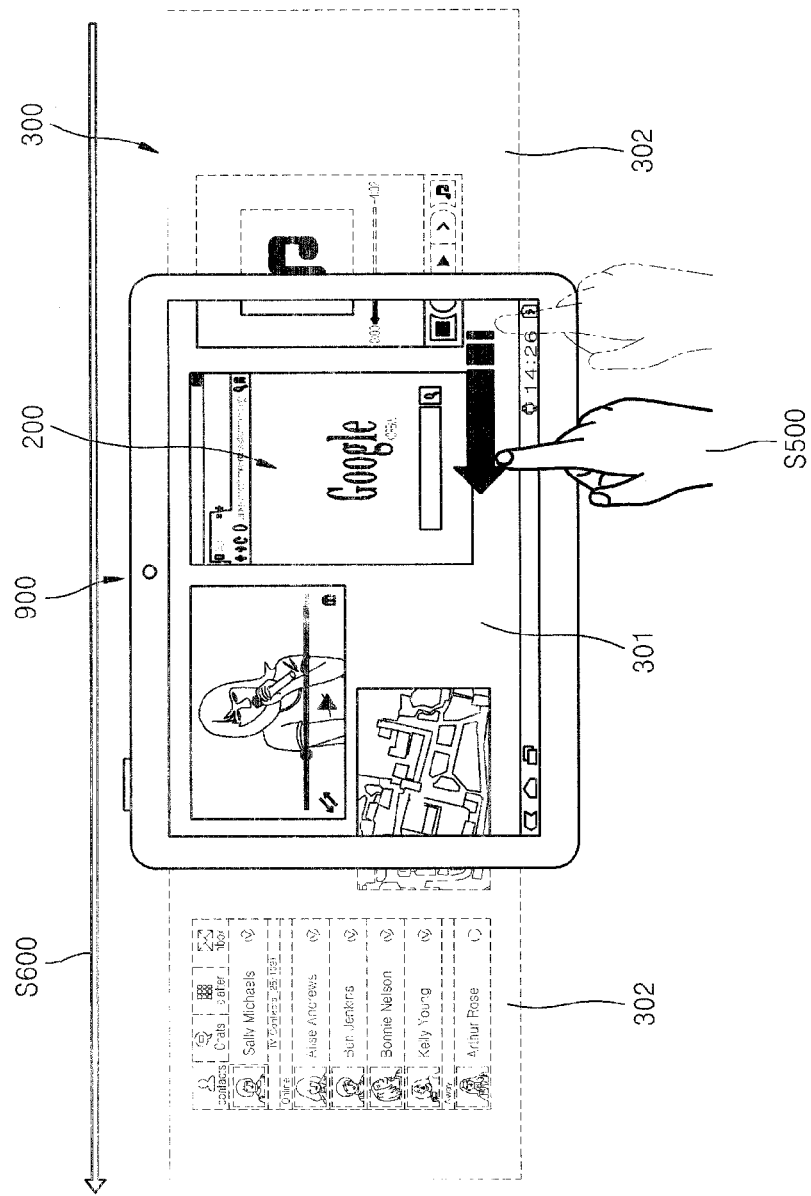
FIG. 22 is a view of movement of the extended background screen and a change of the region currently displayed, according to an exemplary embodiment of the present invention.

FIG. 22 is a view of movement of an extended background screen and a change of a currently-displayed region, according to an exemplary embodiment of the present invention.

Referring to FIGS. 21 and 22, according to an exemplary embodiment of the present invention, the method may further include receiving an external input to the currently-displayed region 301 in operation S500, moving the extended background screen 300 in a predetermined direction based on the received external input in operation S600, and displaying the moved, extended background region 300 in operation S700. The currently-displayed region 301 may be changed according to the movement direction and the movement quantity of the extended background screen 300.

The predetermined direction in which the extended background screen 300 may be moved, may include at least one selected from the group consisting of a vertical direction, a horizontal direction, and a diagonal direction.

As the extended background screen 300 is moved, the region 301 that is currently displayed by a display unit of a terminal 900 may be changed, and execution screens 200 of a plurality of applications arranged on the background screen 300 may be moved by movement of the extended background screen 300. The execution screens 200 of the plurality of applications may be moved in the movement direction of the extended background screen 300, may be moved by the movement quantity of the extended background screen 300 and may be displayed.

For example, if an executed application is displayed as the entire screen by the display unit of the terminal 900, the top of an execution screen 200 of the executed application may be moved in a predetermined direction so that the extended background screen 300 may be moved. For example, the top of the execution screen 200 may be dragged in the left direction so that the extended background screen 300 may be moved to the left.

In particular, as shown in FIG. 22, the extended background screen 300 according to an exemplary embodiment of the present invention may be continuously displayed as a screen including execution screens 200 of a plurality of applications being executed on the terminal 900. For example, the currently-displayed region 301 and the undisplayed region 302 may be continuously changed as the extended background screen 300 is moved, and simultaneously, the whole or a part of the execution screens 200 of the applications may be displayed on the extended background screen 300.

Figure 23:
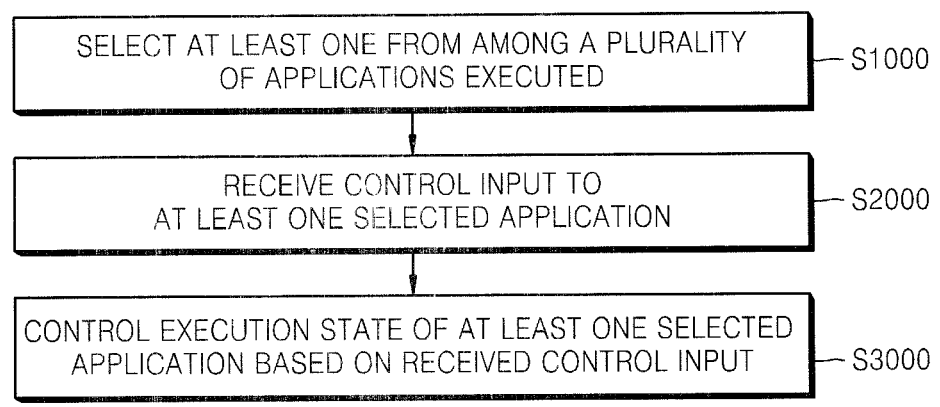
FIG. 23 is a flowchart illustrating an operation of displaying control of applications that are arranged on an extended background screen and are executed thereon, according to an exemplary embodiment of the present invention.

FIG. 23 is a flowchart illustrating an operation of displaying control of applications that are arranged on an extended background screen and are executed thereon, according to an exemplary embodiment of the present invention.

Referring to FIG. 23, according to an exemplary embodiment of the present invention, the method may further include selecting at least one from among a plurality of applications that are executed in operation S1000, receiving a control input to at least one selected application in operation S2000, and controlling an execution state of at least one selected application based on the received control input in operation S3000.

According to an exemplary embodiment of the present invention, controlling the execution state of the application may include at least one selected from the group consisting of changing the size of an execution screen of at least one selected application, changing the position of the execution screen of at least one selected application on the extended background screen 300, and terminating at least one selected application.

Figure 24:
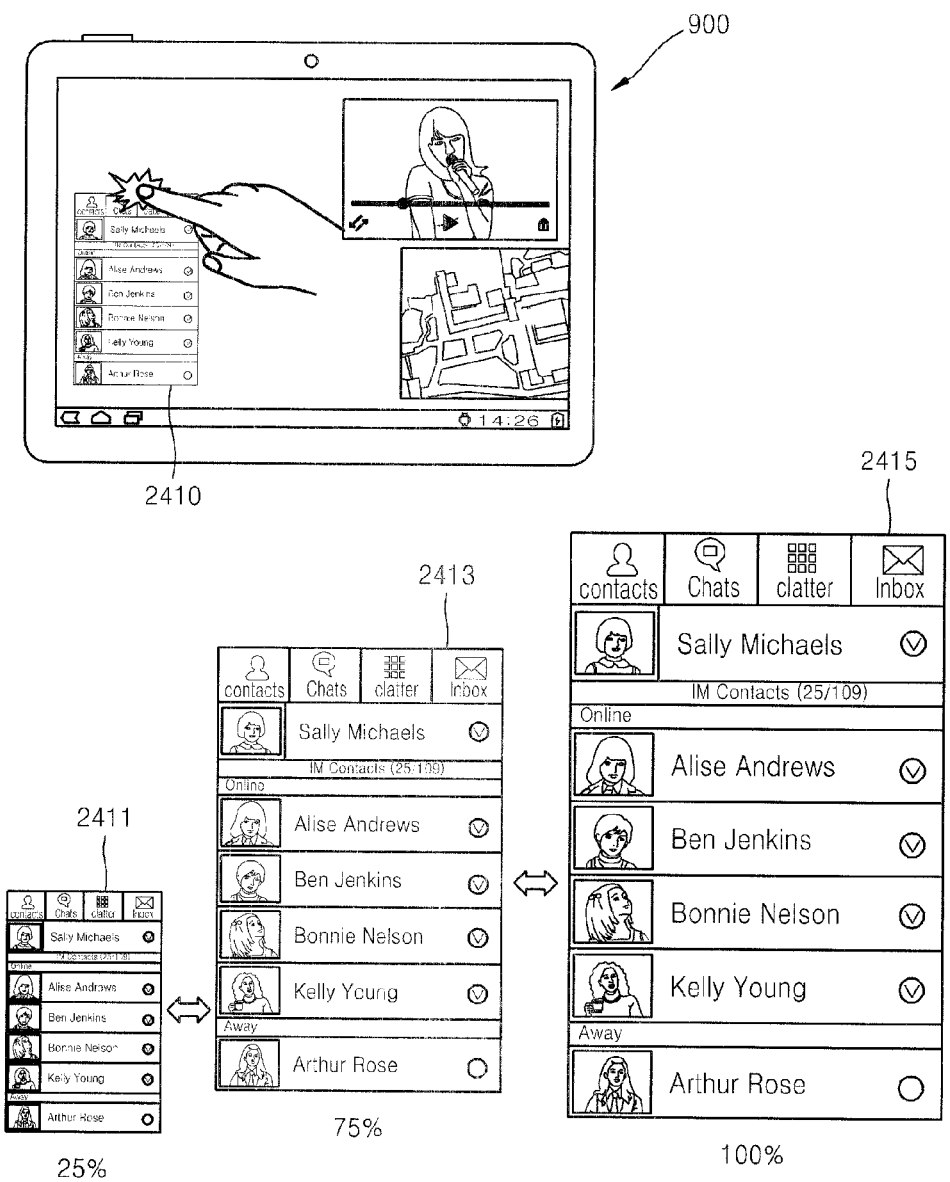
FIG. 24 is a view of control of applications to change a size of an application, according to an exemplary embodiment of the present invention.
Figure 25:
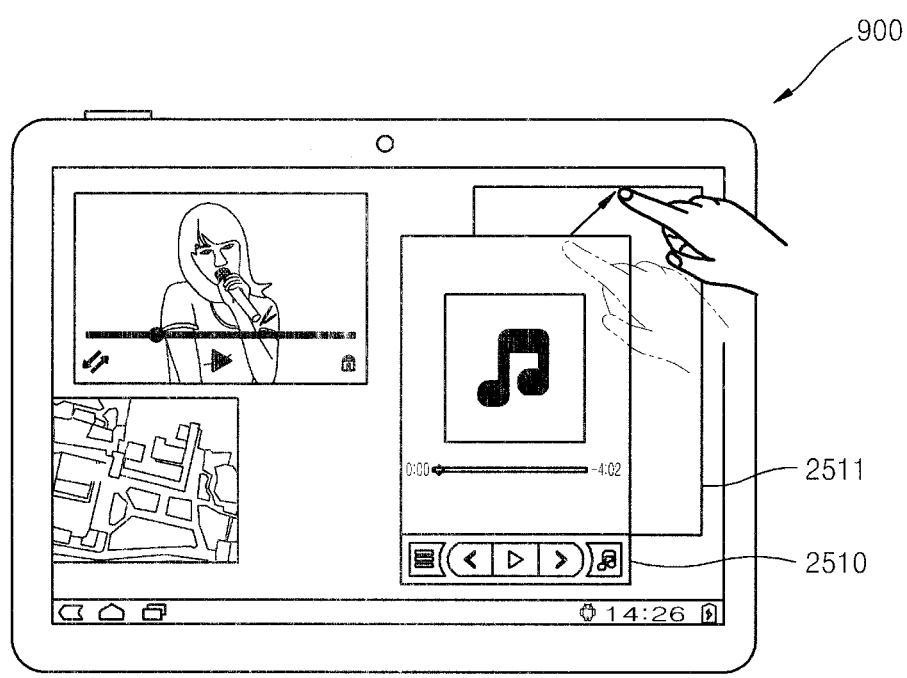
FIG. 25 is a view of control of applications to change a position of an application, according to an exemplary embodiment of the present invention.
Figure 26A:
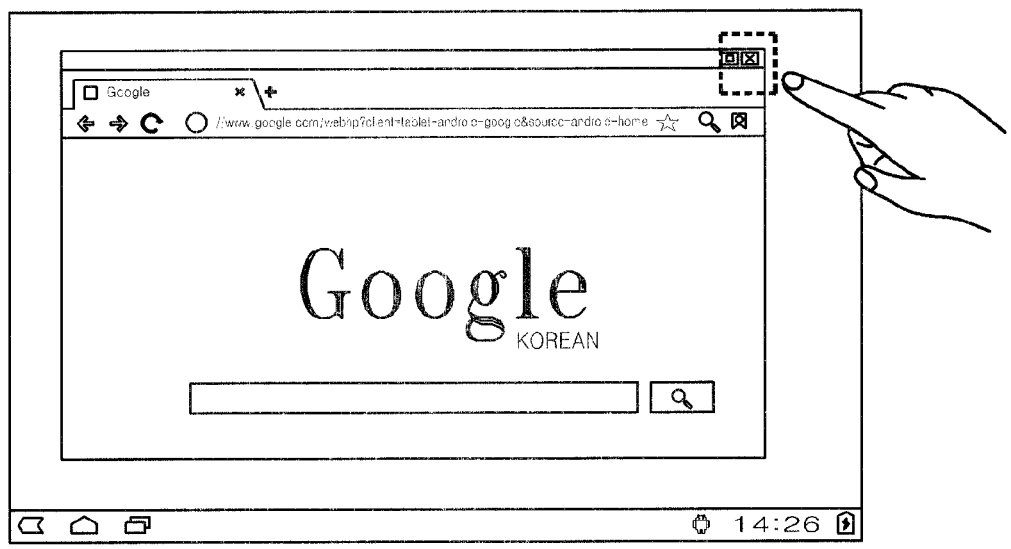
FIGS. 26A and 26B are views of control to terminate an application, according to an exemplary embodiment of the present invention.
Figure 26B:
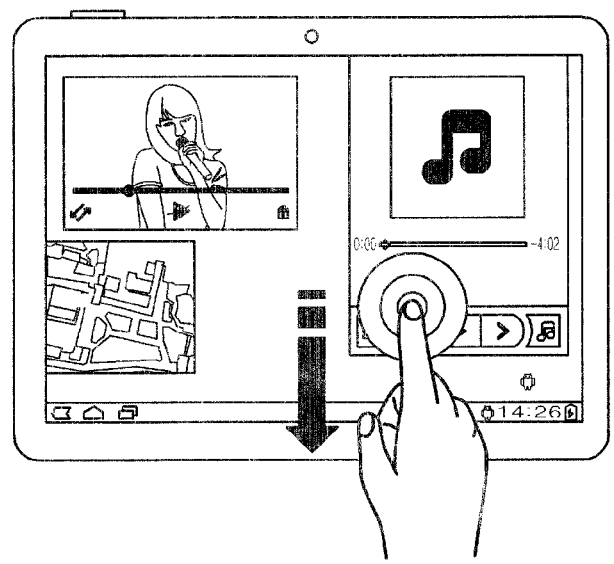

FIG. 24 is a view of control of applications to change a size of an application, according to an exemplary embodiment of the present invention, FIG. 25 is a view of control of applications to change a position of an application, according to an exemplary embodiment of the present invention, and FIGS. 26A and 26B are views of control to terminate an application, according to an exemplary embodiment of the present invention.

Selecting at least one from among a plurality of applications that are executed in operation S1000 may include selecting an application based on an external input to an execution screen of the application.

For example, the external input may include a touch on the execution screen of the executed application, or selection using a keyboard, a joystick, or a mouse. For example, at least one from among a plurality of applications executed may be selected based on the external input applied for a predetermined amount of time, such as 1.5 seconds or 2 seconds.

Receiving a control input to at least one selected application in operation S2000 may include receiving a control input applied to an execution screen of an executed application. The control input may include touch on the execution screen or an input applied using a keyboard, a joystick, or a mouse.

The control input according to an exemplary embodiment of the present invention may include at least one selected from the group consisting of an input for changing the size of an execution screen of at least one selected application, an input for changing the position of an execution screen of at least one selected application on the extended background screen, and an input for terminating at least one selected application.

Referring to FIG. 24, the size of the execution screen of the application may be changed by double clicking the top of the execution screen of the executed application, for example. As illustrated in FIG. 24, the terminal 900 may change the size of an execution screen 2410 of the application at various ratios, such as 25% in screen 2411, 75% in screen 2413, and 100% in screen 2415 with respect to the execution screen 2410.

Referring to FIG. 25, the terminal 900 may change the position of the execution screen of the application on the extended background screen 300 may be from position 2510 to position 2511 by dragging and moving the top of the execution screen of the executed application, for example.

Referring to FIG. 26A, execution of the application may be terminated by clicking a particular portion of the execution screen of the application. Referring to FIG. 26B, execution of the application may alternatively be terminated by moving the execution screen of the application to the bottom of the extended background screen 300.

For example, as illustrated in FIG. 26A, execution of the application may be terminated by clicking a termination button on the execution screen. Also, as illustrated in FIG. 26B, execution of the application may also be terminated by selecting the application to be terminated and by moving the selected application to the bottom of the extended background screen 300.

Figure 27:
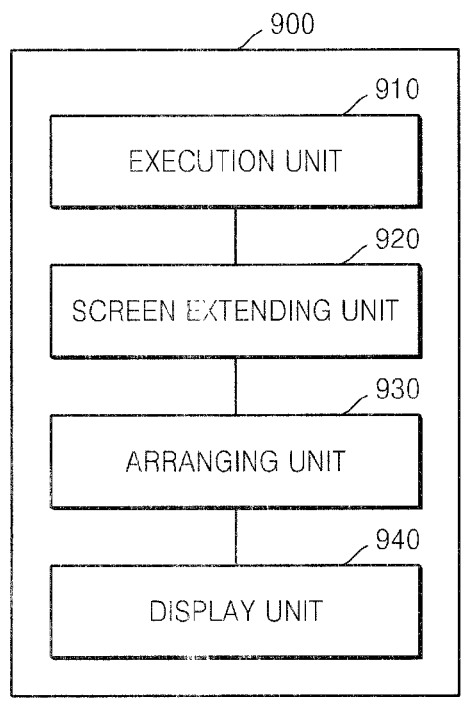
FIG. 27 is a block diagram of a terminal for displaying a plurality of applications, according to an exemplary embodiment of the present invention.

FIG. 27 is a block diagram of a terminal for displaying a plurality of applications, according to an exemplary embodiment of the present invention.

Referring to FIG. 27, the terminal 900 for displaying the plurality of applications being executed on the terminal 900 according to an exemplary embodiment of the present invention may include an execution unit 910 for executing the plurality of applications, a screen extending unit 920 for extending a background screen based on execution, an arranging unit 930 for arranging the plurality of applications executed on the extended background screen, and a display unit 940 for displaying the extended background screen.

The extended background screen 300 may include a region 301 that is currently displayed by the display unit 940 and a region 302 that is not displayed by the display unit 940.

The screen extending unit 920 may include extending the background screen 300 from the currently-displayed region 301 in a predetermined direction as the plurality of applications is executed. The predetermined direction may include at least one selected from the group consisting of a vertical direction, a horizontal direction, and a diagonal direction. The screen extending unit 920 according to another exemplary embodiment of the present invention may extend a virtualized logical space region as the plurality of applications is executed.

The arranging unit 930 may arrange execution screens of the plurality of applications executed on the extended background screen 300 according to a predetermined criterion. The predetermined criterion may include at least one of the order in which the plurality of applications is executed, or types of the plurality of applications. The arranging unit 930 according to another exemplary embodiment of the present invention may arrange execution windows of the plurality of applications executed on the terminal 900 in the virtualized logical space region.

The display unit 940 may display an execution window of at least one application from among execution windows of the plurality of applications arranged in the virtualized logical space region, in a display region of the terminal 900.

Figure 28:
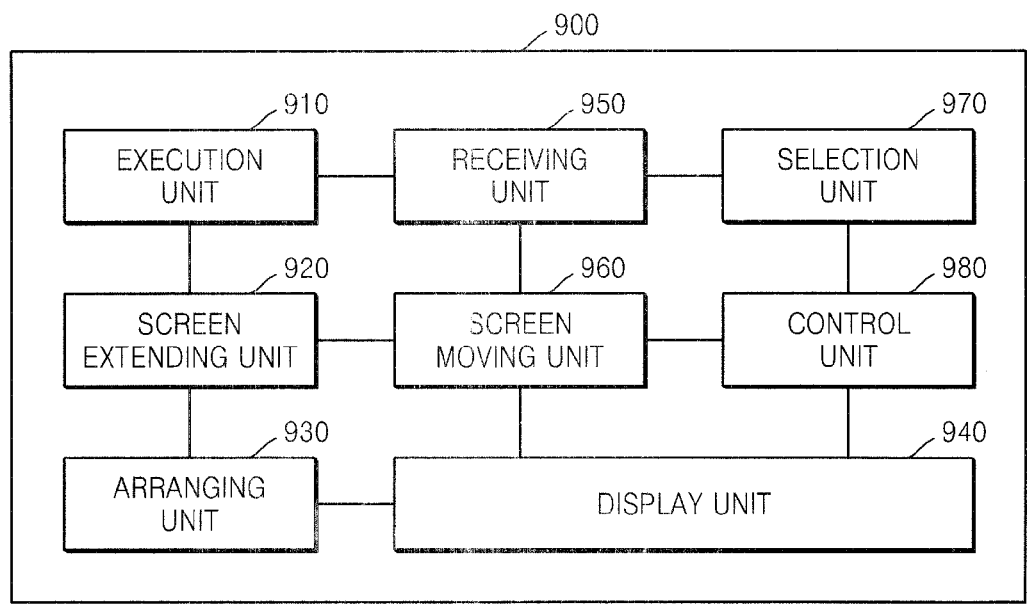
FIG. 28 is a block diagram of a terminal for displaying a plurality of applications, according to an exemplary embodiment of the present invention.

FIG. 28 is a block diagram of a terminal for displaying a plurality of applications, according to an exemplary embodiment of the present invention.

Referring to FIG. 28, the terminal 900 according to the current exemplary embodiment of the present invention, in addition to the terminal 900 described above with reference to FIG. 27, may further include a receiving unit 950 for receiving an external input to the currently-displayed region 301 and a screen moving unit 960 for moving the extended background screen 300 in a predetermined direction based on the received external input, apart from the execution unit 910, the screen extending unit 920, the arranging unit 930, and the display unit 940. Here, the display unit 940 may display the moved, extended background screen 300. The currently-displayed region 301 may be changed according to the movement direction and the movement quantity of the background screen 300. The predetermined direction may include at least one selected from the group consisting of a vertical direction, a horizontal direction, and a diagonal direction.

The screen moving unit 960 of FIG. 28 may move execution windows of the plurality of applications that are arranged in the virtualized logical space region, based on a user's touch input.

Also, the terminal 900 of FIG. 28 may further include a selection unit 970 for selecting at least one from among a plurality of applications executed, a receiving unit 950 for receiving a control input to at least one selected application, and a control unit 980 for controlling an execution state of at least one selected application based on the received control input.

Controlling the execution state of the application according to an exemplary embodiment of the present invention may include at least one selected from the group consisting of the size of an execution screen of at least one selected application, changing the position of an execution screen of at least one selected application on an extended background screen, and terminating at least one selected application. Descriptions relating to the above-described methods may apply to the terminal 900 of FIG. 28. Thus, descriptions regarding the same contents of the terminal 900 as those of the above-described methods and elements will be omitted.

Figure 29:
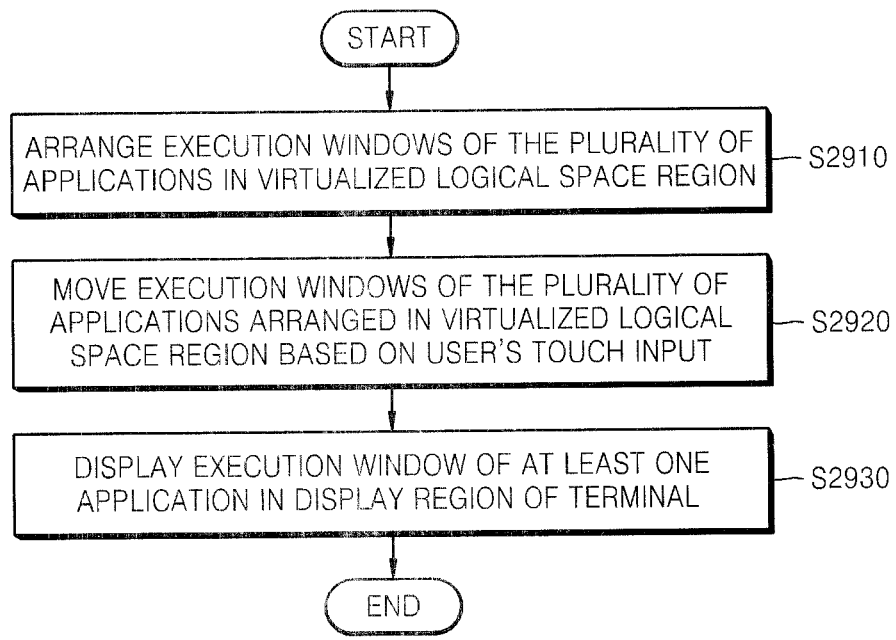
FIG. 29 is a flowchart illustrating a method of executing a plurality of applications, according to an exemplary embodiment of the present invention.

FIG. 29 is a flowchart illustrating a method of executing a plurality of applications, according to an exemplary embodiment of the present invention.

Referring to FIG. 29, the method of executing the plurality of applications according to the current exemplary embodiment of the present invention includes operations to be performed by the terminal 100 of FIG. 18 and the terminal 900 of FIGS. 27 and 28. Thus, although omitted below, the above descriptions regarding the terminals 100 of FIG. 18 and the terminal 900 of FIGS. 27 and 28 may also apply to the method of executing the plurality of applications illustrated in FIG. 29.

In operation S2910, the terminal 900 may arrange execution windows of the plurality of applications to be executed on the terminal 900 in a virtualized logical space region. The virtualized logical space region according to an exemplary embodiment of the present invention may be a space in which a display region of the terminal 900 is virtually extended. Each of the execution windows of the plurality of applications according to an exemplary embodiment of the present invention may have a size that is the same as or smaller than that of the display region of the terminal 900. An execution window of at least one application may be displayed on a page having the same size as that of the display region of the terminal 900.

The terminal 900 according to an exemplary embodiment of the present invention may arrange the execution windows of the plurality of applications in a virtualized logical space region in at least one selected from the group consisting of a vertical direction, a horizontal direction, and a diagonal direction. Also, the terminal 900 according to an exemplary embodiment of the present invention may arrange the execution windows of the plurality of applications in the virtualized logical space region based on at least one of the order in which the plurality of applications is executed, and types of the plurality of applications.

On the other hand, the terminal 900 according to an exemplary embodiment of the present invention may extend the virtualized logical space region based on execution of the plurality of applications. For example, when the plurality of applications is executed, a page is dynamically added to the virtualized logical space region so that the virtualized logical space region may be extended.

According to another exemplary embodiment of the present invention, the virtualized logical space region may be extended based on user's setting. For example, a page is added to the virtualized logical space region based on a user's page addition request so that the virtualized logical space region may be extended (see 1240 of FIG. 12B). In this case, according to an exemplary embodiment of the present invention, the user may also adjust the size of the added page.

In operation S2920, the terminal 900 may move the execution windows of the plurality of applications arranged in the virtualized logical space region based on a user's touch input. For example, when the user drags the screen in a predetermined direction, the terminal 900 may move the execution windows of the plurality of applications in the drag direction so that an execution window of a particular application may be displayed on the screen.

The terminal 900 according to an exemplary embodiment of the present invention may move the virtualized logical space region in which the execution windows of the plurality of applications are arranged, so as to move the execution windows of the plurality of applications. Also, the terminal 900 may also move only the execution windows of the plurality of applications. That is, the terminal 900 may not move the virtualized logical space region but may change only positions where the execution windows of the plurality of applications are arranged, in the virtualized logical space region.

The user's touch input according to an exemplary embodiment of the present invention may include at least one selected from the group consisting of a drag input regarding a region in which an execution window of at least one application is displayed, of the display region of the terminal 900 and a drag input regarding a region in which the execution window of at least one application is not displayed, of the display region of the terminal 900. That is, the user may drag the region in which the execution window of at least one application is displayed, or the region in which the execution window of at least one application is not displayed.

According to an exemplary embodiment of the present invention, when the user drags a region in which an execution window of at least one application from among execution windows of a plurality of applications is displayed in the display region, in a predetermined direction, the terminal 900 moves only the execution window of at least one application, and when the user does not drag a region in which the execution window of at least one application is not displayed in the display region, the terminal 900 may move all of the execution windows of the plurality of applications displayed in the display region.

The terminal 900 according to an exemplary embodiment of the present invention may identify a movement mode relating to movement of the execution windows of the plurality of applications. The terminal 900 may move the execution windows of the plurality of applications according to the identified movement mode. The movement mode according to an exemplary embodiment of the present invention may include a discrete mode in which the execution windows of the plurality of applications are discontinuously moved, and a continuous mode in which the execution windows of the plurality of applications are continuously moved.

For example, the terminal 100 may move the execution windows of the plurality of applications in units of execution window in the discrete mode. The terminal 100 may move the execution windows of the plurality of applications in units of pixel in the continuous mode. The above descriptions of operation S220 of FIG. 2 of moving a plurality of pages according to a movement mode may apply to a method of moving the plurality of applications according to the movement mode and thus, detailed descriptions thereof will be omitted.

In operation S2930, the terminal 900 may display an execution window of at least one application from among the execution windows arranged in the virtualized logical space region in the display region of the terminal 900 according to movement of the execution windows of the plurality of applications.

When the execution window of at least one application is discontinuously moved according to an exemplary embodiment of the present invention, the terminal 900 may display the entire execution window of at least one application on the screen. When the execution window of at least one application is continuously moved according to another exemplary embodiment of the present invention, the terminal 900 may display a part of the execution window of at least one application on the screen according to a movement quantity of the execution window of at least one application.

The method can be performed by program commands that can be executed in a computer and can be recorded on a non-transitory computer-readable recording medium. Examples of the non-transitory computer-readable recording medium can include program commands, data files, data structures, and the like in a single or combination form. The program commands recorded on the non-transitory computer-readable recording medium can be particularly designed and configured for the present invention or can be well-known to one of ordinary skill in computer software. Examples of the non-transitory computer-readable recording mediums include hardware devices that are particularly configured to store and execute program commands, such as hard disks, floppy disks, magnetic media, such as magnetic tapes, optical media, such as Compact Disc (CD)-Read-Only-Memories (ROMs) or Digital Versatile Discs (DVDs), magneto-optical media, such as floptical disks, ROM, Random-Access Memory (RAM), flash memory, etc. Examples of the program commands include advanced language codes that can be executed in a computer by using an interpreter, as well as mechanical language codes that are made by a compiler.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of displaying a plurality of pages on a screen of a terminal, the method comprising:
   detecting a user's gesture that requests movement of the plurality of pages;
   identifying a movement mode relating to the movement of the plurality of pages; and
   moving and displaying a first page displayed on the screen and a second page connected to the first page displayed on the screen according to the identified movement mode,
   wherein the movement mode is one of a discrete mode and a continuous mode, and
   wherein the first page displays content of a first execution window and the second page displays content independent of the first execution window.

2. The method of claim 1, wherein the moving and displaying comprises, in the discrete mode, moving the first page displayed on the screen and the second page connected to the first page in units of page, and in the continuous mode, moving the first page displayed on the screen and the second page connected to the first page in units of pixel.

3. The method of claim 1, wherein the moving and displaying comprises, when the identified movement mode is the discrete mode, moving the first page displayed on the screen and the second page connected to the first page and displaying the second page in an entire region of the screen.

4. The method of claim 1, wherein the moving and displaying comprises, when the identified movement mode is the continuous mode, moving the first page displayed on the screen and the second page connected to the first page and displaying a part of the first page and a part of the second page together on the screen.

5. The method of claim 4, further comprising:
   determining a size of the part of the first page displayed on the screen and a size of the part of the second page displayed on the screen based on a length of the user's gesture.

6. The method of claim 4, further comprising:
   detecting a user's input that requests execution of at least one application; and displaying an execution window of the at least one application on the part of the first page displayed on the screen and the part of the second page displayed on the screen in response to the user's input.

7. The method of claim 6, further comprising:
detecting a user's mode change request that changes the movement mode from the continuous mode to the discrete mode; changing the movement mode from the continuous mode to the discrete mode in response to the user's mode change request;
selecting one of the first page and the second page; and
displaying the execution window of the at least one application on the one selected page.

8. The method of claim 7, wherein the selecting of the one of the first page and the second page comprises selecting the one of the first page and the second page based on a ratio of a first portion of the execution window of the at least one application displayed in the first page to a second portion of the execution window of the at least one application displayed in the second page.

9. The method of claim 7, wherein the changing of the movement mode from the continuous mode to the discrete mode comprises:
selecting one of the first page and the second page based on a ratio of the part of the first page displayed on the screen to the part of the second page displayed on the screen; and
displaying the one selected page of the first page and the second page in an entire region of the screen.

10. The method of claim 1, further comprising:
setting the movement mode in advance based on a user's input.

11. The method of claim 1, wherein the identifying of the movement mode comprises identifying the movement mode based on a type of the user's gesture, and
wherein the user's gesture comprises at least one of a drag gesture and a flick gesture.

12. The method of claim 11, wherein the identifying of the movement mode comprises, if the user's gesture comprises a one-finger drag input, determining that the movement mode is the discrete mode, and if the user's gesture comprises a two-finger drag input, determining that the movement mode is the continuous mode.

13. The method of claim 1, wherein the second page is a page connected to the first page in at least one selected from a group consisting of a vertical direction, a horizontal direction, and a diagonal direction.

14. The method of claim 1, further comprising:
receiving a user's pinch input on the screen;
displaying all of the plurality of pages as thumbnails on the screen;
as one page is selected from the plurality of pages displayed as thumbnails and the selected page is dragged and dropped, changing positions where the plurality of pages is arranged; and
as an execution window of an application displayed on a third page from among the plurality of pages displayed as thumbnails is selected and is dragged and dropped to a fourth page, moving the execution window of the application from the third page to the fourth page and displaying the execution window of the application on the fourth page.

15. The method of claim 1, further comprising:
displaying a list of at least one application that is executed by the terminal on the screen;
receiving a selection of at least one application from the list of the at least one application; and
displaying a page where an execution window of the selected application is included, from among the plurality of pages, on the screen of the terminal.

16. The method of claim 1, further comprising:
as an execution window of an application included in the first page displayed on the screen is selected and flicked in a direction of the second page, moving the execution window of the selected application from the first page displayed on the screen to the second page connected to the first page; and
displaying the second page to which the execution window of the application is moved, on the screen.

17. A terminal for displaying a plurality of pages, the terminal comprising:
a display;
a user input unit; and
a processor configured to:
control the user input unit to detect a user's gesture that requests movement of a plurality of pages,
identify a movement mode relating to the movement of the plurality of pages, and
control the display to move and display a first page displayed on a screen of the display and a second page connected to the first page displayed on the screen according to the identified movement mode,
wherein the movement mode is one of a discrete mode and a continuous mode, and
wherein the first page displays content of a first execution window and the second page displays content independent of the first execution window.

18. The terminal of claim 17, wherein, when the identified movement mode is the discrete mode, the processor is further configured to control the display to move the first page displayed on the screen and the second page connected to the first page, and display the second page in an entire region of the screen, and
wherein, when the identified movement mode is the continuous mode, the processor is further configured to control the display to move the first page displayed on the screen and the second page connected to the first page, and display a part of the first page and a part of the second page together on the screen.

19. The terminal of claim 18, wherein the processor is further configured to determine a size of the part of the first page displayed on the screen and a size of the part of the second page displayed on the screen based on a length of the user's gesture.

20. The terminal of claim 18, wherein the user input unit is further configured to detect a user's input that requests execution of at least one application, and the display is further configured to display an execution window of the at least one application on the part of the first page displayed on the screen and the part of the second page displayed on the screen in response to the user's input.

21. The terminal of claim 20, wherein the user input unit is further configured to detect a user's mode change request that changes the movement mode from the continuous mode to the discrete mode, and the processor is further configured to change the movement mode from the continuous mode to the discrete mode and selects one of the first page and the second page, and control the display so that the execution window of the at least one application is displayed on the one selected page in response to the user's mode change request.

22. The terminal of claim 17, wherein the processor is further configured to set the movement mode in advance based on a user's input.

23. The terminal of claim 17, wherein the processor is further configured to identify the movement mode based on a type of the user's gesture.

24. The terminal of claim 23, wherein, if the user's gesture comprises a one-finger drag input, the processor is further configured to determine that the movement mode is the discrete mode, and if the gesture comprises a two-finger drag input, the processor is further configured to determine that the movement mode is the continuous mode.

25. The terminal of claim 17, wherein the user input unit is further configured to receive a user's pinch input on the screen, the display is further configured to display all of the plurality of pages as thumbnails on the screen, as one page is selected from the plurality of pages displayed as thumbnails and the selected page is dragged and dropped, the processor is further configured to change positions where the plurality of pages is arranged, and as one page is selected from the plurality of pages displayed as thumbnails and the selected page is dragged and dropped, the processor is further configured to change positions where the plurality of pages is arranged.

26. The terminal of claim 17, wherein the display is further configured to display a list of at least one application that is executed by the terminal on the screen, the user input unit is further configured to receive a selection of at least one application from the list of the at least one application, and the display is further configured to display a page where an execution window of the selected application is included, from among the plurality of pages, on the screen of the terminal.

27. The terminal of claim 17, wherein, as an execution window of an application included in the first page displayed on the screen is selected and flicked in a direction of the second page, the processor is further configured to move the execution window of the selected application from the first page displayed on the screen to the second page connected to the first page.

* * * * *